(12) United States Patent
Isono

(10) Patent No.: US 7,950,275 B2
(45) Date of Patent: May 31, 2011

(54) MANIPULATION SIMULATOR

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 103 days.

(21) Appl. No.: 12/516,213

(22) PCT Filed: Nov. 30, 2007

(86) PCT No.: PCT/JP2007/073632
§ 371 (c)(1),
(2), (4) Date: May 26, 2009

(87) PCT Pub. No.: WO2008/069294
PCT Pub. Date: Jun. 12, 2008

(65) Prior Publication Data
US 2010/0070252 A1    Mar. 18, 2010

(30) Foreign Application Priority Data
Dec. 8, 2006    (JP) .................................. 2006-332308

(51) Int. Cl.
*G01L 5/28* (2006.01)
(52) U.S. Cl. .......................................................... 73/132
(58) Field of Classification Search .................... 73/132
See application file for complete search history.

(56) References Cited

U.S. PATENT DOCUMENTS

| | | | | |
|---|---|---|---|---|
| 2,415,618 A | * | 2/1947 | West | 417/498 |
| 3,477,345 A | * | 11/1969 | Johnson | 91/207 |
| 4,553,506 A | * | 11/1985 | Bekiaroglou | 123/45 R |
| 7,290,841 B2 | * | 11/2007 | Isono | 303/114.1 |
| 7,309,112 B2 | * | 12/2007 | Isono | 303/11 |
| 7,425,042 B2 | * | 9/2008 | Fujiwara et al. | 303/114.1 |
| 7,644,997 B2 | * | 1/2010 | Isono | 303/115.1 |
| 7,770,472 B2 | * | 8/2010 | Isono et al. | 73/862.625 |
| 7,779,629 B2 | * | 8/2010 | Isono et al. | 60/413 |
| 2002/0124563 A1 | * | 9/2002 | Ogiwara et al. | 60/588 |
| 2003/0160504 A1 | * | 8/2003 | Chris | 303/114.1 |
| 2008/0003110 A1 | * | 1/2008 | Isono | 417/233 |
| 2010/0018335 A1 | * | 1/2010 | Isono | 74/110 |
| 2010/0064842 A1 | * | 3/2010 | Isono | 74/512 |

FOREIGN PATENT DOCUMENTS

| | | |
|---|---|---|
| JP | 50 107878 | 9/1975 |
| JP | 53 76263 | 7/1978 |
| JP | 7 277173 | 10/1995 |
| JP | 10 138891 | 5/1998 |

(Continued)

*Primary Examiner* — Freddie Kirkland, III
(74) *Attorney, Agent, or Firm* — Oblon, Spivak, McCelland, Maier & Neustadt, L.L.P.

(57) ABSTRACT

A manipulation simulator including an input member which moves in response to a driver's braking operation; a reaction force generation device which generates a reaction force according to an amount of deformation; an output member which deforms the reaction force generation device; and a transmission device between the input member and the output member, which transmits a reaction force of the reaction force generation device to the input member via the output member. The input member moves rectilinearly; the reaction force generation device generates a reaction force linearly according to its deformation amount; the transmission device converts the input member rectilinear motion to a rotary motion that is transmitted to the output member; and the ratio of the amount of output member motion to the amount of input member motion is varied continuously and nonlinearly according to the amount of input member motion.

30 Claims, 18 Drawing Sheets

FOREIGN PATENT DOCUMENTS

| JP | 2003 312467 | 11/2003 |
| JP | 2005 53302 | 3/2005 |
| JP | 2005 112034 | 4/2005 |
| JP | 2005 219687 | 8/2005 |
| JP | 2006 151031 | 6/2006 |
| JP | 2006 193012 | 7/2006 |

* cited by examiner

US 7,950,275 B2

MANIPULATION SIMULATOR

TECHNICAL FIELD

The present invention relates to a manipulation simulator and, more particularly, to a manipulation simulator, such as a brake stroke simulator of a brake apparatus of an automobile or a like vehicle, which permits an operator to operate an operation means and applies a required operational reaction force to the operator via the operation means.

BACKGROUND ART

In a brake apparatus of a vehicle, such as an automobile, when a driver depresses a brake pedal, braking operation is performed. In the case of a brake apparatus in which braking pressures for wheels are controlled on the basis of the magnitude of braking operation by the driver, generally, the rate of increase of an operational reaction force which the driver feels gradually increases with the magnitude of braking operation by the driver. Thus, the magnitude of braking operation by the driver (brake stroke) and the operational reaction force (brake reaction force) are preferably in a nonlinear relation.

Conventionally, there have been proposed brake stroke simulators of various configurations which achieve a nonlinear characteristic of brake stroke vs. brake reaction force. For example, Japanese Patent Application Laid-Open (kokai) No. 2005-112034 describes a brake stroke simulator configured to be able to adjust a nonlinear brake stroke vs. brake reaction characteristic.

A conventional brake stroke simulator in which a brake stroke and a brake reaction force are in a nonlinear relation generally has a plurality of reaction force generation springs whose spring constants are fixed and differ from one another. In generation of reaction force, the different reaction force generation springs are individually selected according to a brake stroke, thereby achieving a nonlinear characteristic. Accordingly, the relation of the brake reaction force to a brake stroke is of discontinuous nonlinearity; in other words, the relation fails to exhibit preferred continuous nonlinearity.

In order for the relation of the brake reaction force to the brake stroke to be of continuous nonlinearity, a single reaction force generation spring having a nonlinear spring characteristic can conceivably be used. However, it is very difficult to form a reaction force generation spring which imparts preferred continuous nonlinearity to the relation of the brake reaction force to the brake stroke over the entire range of brake stroke.

The above-mentioned problem in relation to a brake stroke vs. brake reaction force characteristic is not limitingly involved only in the brake stroke simulator, but is also involved in other manipulation simulators, such as a flight simulator, in which operation means is operated by an operator and which allows the operator to operate the operation means and applies an operational reaction force to the operator via the operation means.

DISCLOSURE OF THE INVENTION

A primary object of the present invention is to provide a manipulation simulator in which, by means of imparting continuous nonlinearity to the relation between the magnitude of operation of operation means conducted by an operator and the amount of deformation of a reaction force generation spring, even when the reaction generation spring has a linear spring characteristic, the relation between the magnitude of operation and an operational reaction force exhibits a preferred continuous nonlinear characteristic over the entire range of operation of the operation means.

The present invention provides a manipulation simulator comprising an input member which moves in response to operator's operation of operation means; reaction force generation means which generates a reaction force according to an amount of deformation thereof; an output member whose motion deforms the reaction force generation means; and transmission means provided between the input member and the output member and adapted to transmit a motion of the input member to the output member and to transmit the reaction force of the reaction force generation means to the input member via the output member. The manipulation simulator allows the operator to operate the operation means, and applies an operational reaction force to the operator via the operation means. The motion of the input member is a rectilinear motion; the reaction force generation means generates the reaction force linearly according to the amount of deformation thereof; and the transmission means is configured to continuously and nonlinearly vary a ratio of an amount of motion of the output member to an amount of motion of the input member according to the amount of motion of the input member.

According to this configuration, the ratio of the amount of deformation of the reaction force generation means to the amount of motion of the input member can be varied continuously and nonlinearly according to the amount of motion of the input member. Accordingly, even when the reaction force generation means generates a reaction force linearly according to the amount of its deformation, desired continuous nonlinearity can be imparted to the relation of reaction force of the reaction force generation means to the amount of motion of the input member. Thus, the relation between the magnitude of operation and an operational reaction force can exhibit a preferred continuous nonlinear characteristic over the entire range of operation.

The above-mentioned configuration may be such that: the transmission means includes a cam provided on the input member and a cam follower provided on the output member and engaged with the cam, and, by means of the cam follower moving to follow the cam, the ratio of the amount of motion of the output member to the amount of motion of the input member is varied continuously and nonlinearly according to the amount of motion of the input member.

According to this configuration, the ratio of the amount of motion of the output member to the amount of motion of the input member can be reliably varied continuously and nonlinearly according to the amount of motion of the input member and can exhibit a desired continuous nonlinear characteristic through setting of the cam and the cam follower.

The above-mentioned configuration may be such that: the input member moves rectilinearly along an axis, and the input member and the output member are coaxial with respect to the axis and are fitted to each other in a relatively movable relation.

According to this configuration, as compared with, for example, a structure in which the input member and the output member are disposed along the axis, the axial length of the manipulation simulator can be reduced, whereby the manipulation simulator can be rendered compact.

The above-mentioned configuration may be such that: the transmission means converts a rectilinear motion of the input member to a rotary motion and transmits the rotary motion to the output member, and the transmission means converts a rotary reaction force which the output member receives from the reaction force generation means, to a reaction force directed opposite the direction of the rectilinear motion of the input member and transmits the reaction force to the input member.

According to this configuration, means which generates a reaction force upon subjection to rotary deformation can be employed as the reaction force generation means.

The above-mentioned configuration may be such that: one of the cam and the cam follower is a cam groove, whereas the other of the cam and the cam follower is a cam groove engagement member which is engaged with the cam groove and moves along the cam groove, and the cam groove extends while being inclined with respect to a circumferential direction about the axis and is curved such that an angle of inclination with respect to the circumferential direction varies gradually and continuously.

According to this configuration, by means of the cam groove engagement member engaged with the cam groove moving along the cam groove, the ratio of the amount of motion of the output member to the amount of motion of the input member can be varied continuously and nonlinearly according to the amount of motion of the input member and thus can exhibit a desired continuous nonlinear characteristic through setting of the shape of curve of the cam groove.

The above-mentioned configuration may be such that: through subjection to deformation about the axis, the reaction force generation means generates a rotary reaction force about the axis linearly according to the amount of deformation.

According to this configuration, a rotary reaction force about the axis which increases and decreases linearly according to the amount of rotary motion of the output member about the axis can be applied to the output member.

The above-mentioned configuration may be such that: the transmission means converts the rectilinear motion of the input member to a rectilinear motion of a different direction and transmits the rectilinear motion of the different direction to the output member.

According to this configuration, the direction of rectilinear motion of the output member can be set different from that of rectilinear motion of the input member. Thus, the direction of deformation of the reaction force generation means caused by the output member can be set different from the direction of rectilinear motion of the input member.

The above-mentioned configuration may be such that: the direction of rectilinear motion of the output member is opposite the direction of rectilinear motion of the input member.

According to this configuration, the reaction force generation means can be disposed in such a manner as to be deformed in a direction opposite the direction of rectilinear motion of the input member, whereby the reaction force generation means can generate a reaction force in the same direction as that of rectilinear motion of the input member.

The above-mentioned configuration may be such that: the transmission means includes an intermediate member, first transmission means which converts the rectilinear motion of the input member to a rotary motion and transmits the rotary motion to the intermediate member, and second transmission means which converts the rotary motion of the intermediate member to a rectilinear motion and transmits the rectilinear motion to the output member, and at least one of the first transmission means and the second transmission means varies a ratio of an amount of motion of a motion transmission destination member to an amount of motion of a motion transmission source member continuously and nonlinearly according to the amount of motion of the motion transmission source member.

According to this configuration, the rectilinear motion of the input member is converted to the rectilinear motion of the output member via the rotary motion of the intermediate member, and the ratio of the amount of rectilinear motion of the output member to the amount of rectilinear motion of the input member can be varied continuously and nonlinearly according to the amount of motion of the input member.

The above-mentioned configuration may be such that: the input member moves rectilinearly along an axis, and the direction of rectilinear motion of the output member intersects the axis.

According to this configuration, the reaction force generation means can be disposed in such a manner as to be subjected to deformation whose direction intersects the direction of rectilinear motion of the input member.

The above-mentioned configuration may be such that: the input member and the output member move rectilinearly along a common axis, and the input member and the output member are coaxial with respect to the axis and are fitted to the intermediate member.

According to this configuration, as compared with a structure in which the input member and the output member move rectilinearly along mutually different axes and a structure in which the input member or the output member is not fitted to the intermediate member, the axial length of the manipulation simulator can be reduced, whereby the manipulation simulator can be rendered compact.

The above-mentioned configuration may be such that: the first transmission means is configured to continuously and nonlinearly vary a ratio of an amount of motion of the intermediate member to an amount of motion of the input member according to the amount of motion of the input member, and the second transmission means is configured to continuously and nonlinearly vary a ratio of an amount of motion of the output member to the amount of motion of the intermediate member according to the amount of motion of the intermediate member.

According to this configuration, as compared with a structure in which only one of the first transmission means and the second transmission means varies the ratio between the amounts of motion continuously and nonlinearly, there can be reduced the amount of variation in the ratio between the amounts of motion to be achieved by each of the first transmission means and the second transmission means.

The above-mentioned configuration may be such that: each of the first transmission means and the second transmission means has a cam provided on the motion transmission source member and a cam follower provided on the motion transmission destination member and engaged with the cam, and, by means of the cam follower moving to follow the cam, the ratio of the amount of motion of the motion transmission destination member to the amount of motion of the motion transmission source member is varied continuously and nonlinearly according to the amount of motion of the motion transmission source member.

According to this configuration, the ratio of the amount of motion of the motion transmission destination member to the amount of motion of the motion transmission source member can be reliably varied continuously and nonlinearly according to the amount of motion of the motion transmission source member and can exhibit a desired continuous nonlinear characteristic through setting of the cam and the cam follower.

The above-mentioned configuration may be such that: one of the cam and the cam follower is a cam groove, whereas the other of the cam and the cam follower is a cam groove engagement member which is engaged with the cam groove and moves along the cam groove, and the cam groove of at least one of the first transmission means and the second transmission means extends while being inclined with respect to a circumferential direction about the axis, and is curved such that an angle of inclination with respect to the circumferential direction varies gradually and continuously.

According to this configuration, by means of the cam groove engagement member engaged with the cam groove moving along the cam groove, the ratio of the amount of motion of the motion transmission destination member to the amount of motion of the motion transmission source member can be varied continuously and nonlinearly according to the amount of motion of the motion transmission source member and thus can exhibit a desired continuous nonlinear characteristic through setting of the shape of curve of the cam groove.

The above-mentioned configuration may be such that: the cam groove of the first transmission means and the cam groove of the second transmission means have the same angle of inclination with respect to the circumferential direction as measured at respective positions where, when the amount of motion of the input member is zero, the cam groove engagement members are engaged with the corresponding cam grooves.

According to this configuration, as compared with a structure in which the cam groove of the first transmission means and the cam groove of the second transmission means have mutually different angles of inclination with respect to the circumferential direction as measured at respective positions where the cam groove engagement members are engaged with the corresponding cam grooves when the amount of motion of the input member is zero, at the time of start and end of the rectilinear motion of the input member, the rotary motion of the intermediate member can be smoothly started and ended. Thus, the conversion of motion and the transmission of reaction force can be smoothly carried out between the input member and the intermediate member and between the intermediate member and the output member.

The above-mentioned configuration may be such that: the manipulation simulator includes a housing for accommodating the input member, the intermediate member, and the output member therein; the intermediate member is fitted to the input member and the output member in such a manner as to surround the input member and the output member about the axis, and supports the input member and the output member in such a manner that the input member and the output member are rectilinearly movable along the axis; the housing is fitted to the intermediate member in such a manner as to surround the intermediate member about the axis, and supports the intermediate member in such a manner that the intermediate member is rotatable about the axis; the cam groove of the first transmission means and the cam groove of the second transmission means are provided on the intermediate member; the cam groove engagement member of the first transmission means and the cam groove engagement member of the second transmission means are provided on the input member and the output member, respectively; the housing has guide grooves extending along the axis; and the cam groove engagement member of the first transmission means and the cam groove engagement member of the second transmission means radially extend through the cam groove of the first transmission means and the cam groove of the second transmission means, respectively, and are engaged with the corresponding guide grooves in such a manner as to be movable along the guide grooves.

According to this configuration, as compared with a structure in which the input member and the output member move rectilinearly along mutually different axes and a structure in which the intermediate member is not fitted to the input member or the output member, the axial length of the manipulation simulator can be reduced, whereby the manipulation simulator can be rendered compact. Also, those members which undergo a rectilinear motion or a rotary motion can be prevented from being exposed. By means of fixing the housing to support means, such as a vehicle body, the manipulation simulator can be readily and reliably fixed to the support means.

The cam groove engagement member of the first transmission means and the cam groove engagement member of the second transmission means can be reliably guided along the axis by the guide grooves. Thus, as compared with a structure in which the housing does not have the guide grooves, the conversion of motion can be smoothly carried out between a rectilinear motion of the input member and a rotary motion of the intermediate member and between a rotary motion of the intermediate member and a rectilinear motion of the output member.

Further, the housing can bear a portion of the stress imposed on the cam groove engagement members of the first and second transmission means during the conversion of motion between a rectilinear motion of the input member and a rotary motion of the intermediate member and the conversion of motion between a rotary motion of the intermediate member and a rectilinear motion of the output member. Accordingly, as compared with a structure in which the housing does not have the guide grooves, the durability of the manipulation simulator can be improved.

The above-mentioned configuration may be such that: the ratio of the amount of motion of the output member to the amount of motion of the intermediate member is greater than the ratio of the amount of motion of the intermediate member to the amount of motion of the input member.

According to this configuration, as compared with a structure in which the ratio of the amount of motion of the output member to the amount of motion of the intermediate member is smaller than the ratio of the amount of motion of the intermediate member to the amount of motion of the input member, the amount of rotary motion of the intermediate member required for achieving the same continuous nonlinear characteristic can be reduced.

The above-mentioned configuration may be such that: the first transmission means and the second transmission means are configured to rectilinearly move the output member along the axis in the same direction as that of rectilinear motion of the input member.

According to this configuration, as compared with a structure in which the first transmission means and the second transmission means are configured to rectilinearly move the output member along the axis in a direction opposite the direction of rectilinear motion of the input member, the distance between the input member and the output member as measured when the amount of rectilinear motion of the input member is zero can be reduced. Thus, the axial length of the manipulation simulator along the axis can be reduced.

The above-mentioned configuration may be such that: when the amount of motion of the input member is zero, the input member and the output member are in contact with each other.

According to this configuration, as compared with a structure in which, even when the amount of motion of the input member is zero, the input member and the output member are spaced apart from each other, the axial length of the manipulation simulator can be reduced, and, when the amount of motion of the input member is zero, a shaky movement of the input member and the output member can be reliably reduced.

The above-mentioned configuration may be such that: the reaction force generation means is elastically attached between the output member and the housing and is subjected to compressive deformation along the axis.

According to this configuration, the reaction force generation means can effectively apply a reaction force to the output member.

The above-mentioned configuration may be such that: the manipulation simulator includes tensile stress generation means which is elastically attached between the input member and the output member and which, upon subjection to tensile deformation along the axis, generates tensile stress along the axis linearly according to an amount of tensile deformation.

According to this configuration, a reaction force to be applied to the input member is the difference between a reaction force of the reaction force generation means to be transmitted to the input member via the output member and the intermediate member, and a tensile stress of the tensile stress generation means to be transmitted directly to the input member. Accordingly, the ratio of a reaction force to be transmitted to the input member to the amount of motion of the input member can be set so as to establish a continuous nonlinearity different from that exhibited by the ratio of reaction force of the reaction force generation means to the amount of motion of the input member which is uniquely determined by the ratio of the amount of motion of the output member to the amount of motion of the input member. Thus, as compared with a structure in which the tensile stress generation means is not provided, there can be increased the degree of freedom of setting of the ratio of a reaction force to be transmitted to the input member to the amount of motion of the input member.

The above-mentioned configuration may be such that: the input member and the output member are spaced apart from each other along the axis at the same circumferential position about the axis, and the cam groove engagement member of the first transmission means and the cam groove engagement member of the second transmission means are engaged with a common guide groove.

According to this configuration, as compared with a structure in which the input member and the output member are provided at different circumferential positions about the axis, and the cam groove engagement members of the first and second transmission means are engaged with respective guide grooves, the number of guide grooves can be reduced, whereby the structure of the manipulation simulator can be simplified.

The above-mentioned configuration may be such that: the input member and the output member have respective portions which are engaged with each other along the axis; and the first transmission means and the second transmission means are provided at the portion of the input member and the portion of the output member, respectively, and are separated from each other in a circumferential direction about the axis.

According to this configuration, as compared with a structure in which the input member and the output member do not have respective portions which are engaged with each other along the axis, and the first transmission means and the second transmission means are spaced apart from each other along the axis, the axial length of the manipulation simulator can be reduced, whereby the manipulation simulator can be rendered compact.

The above-mentioned configuration may be such that: the input member and the output member have respective pairs of arm portions extending along the axis toward the output member and the input member, respectively, and the paired arm portions of the input member and the paired arm portions of the output member are disposed alternately as viewed along a circumferential direction about the axis and prevent a relative rotary motion about the axis between the input member and the output member while allowing a relative rectilinear motion along the axis between the input member and the output member.

According to this configuration, a rotary reaction force which the input member receives from the intermediate member at the time of conversion of rectilinear motion of the input member to rotary motion of the intermediate member, and a rotary reaction force which the intermediate member receives from the output member at the time of conversion of rotary motion of the intermediate member to rectilinear motion of the output member, are directed opposite to each other about the axis.

Accordingly, the input member and the output member can bear at least a portion of rotary reaction force generated through conversion of motion between a rectilinear motion and a rotary motion, whereby a rotary reaction force which the first and second transmission means are to bear can be reduced. Thus, as compared with a structure in which a pair of arm portions of the input member and a pair of arm portions of the output member are not configured to prevent a relative rotary motion about the axis between the input member and the output member, the durability of the manipulation simulator can be improved.

The above-mentioned configuration may be such that: the input member and the output member have the same shape and are disposed along the axis in an oppositely oriented relation.

According to this configuration, the input member and the output member can be of common use. Thus, as compared with a structure in which the input member and the output member are different members having different shapes, the number of types of components can be reduced, so that the cost of the manipulation simulator can be reduced.

The above-mentioned configuration may be such that: one of the input member and the output member has a shaft portion which extends along the axis toward the other member of the input member and the output member, and the other member has a recess which extends along the axis and receives the shaft portion in such a manner that the shaft portion and the recess are rectilinearly movable along the axis in relation to each other; the cam groove engagement member of the first transmission means and the cam groove engagement member of the second transmission means are provided at the shaft portion and at a portion around the recess, respectively, and are spaced apart from each other along a circumferential direction about the axis; and the portion around the recess has a slit for allowing the cam groove engagement member provided at the shaft portion to rectilinearly move along the axis in relation to the portion around the recess.

According to this configuration, as compared with a structure in which the shaft portion provided on one of the input member and the output member is not received in the recess provided in the other member in such a manner that the shaft portion and the recess are rectilinearly movable along the axis in relation to each other, a shaky movement of the input member and the output member can be reliably reduced.

Also, as compared with a structure in which the input member and the output member do not have the shaft portion and the recess, and the first and second transmission means are spaced apart from each other along the axis, the axial length of the manipulation simulator can be reduced, whereby the manipulation simulator can be rendered compact. Furthermore, there can be reliably prevented a problem in that the portion around the recess hinders a rectilinear motion along the axis of the cam groove engagement member in relation to the portion around the recess.

The above-mentioned configuration may be such that: the first transmission means and the second transmission means are configured to rectilinearly move the output member along the axis in a direction opposite that of rectilinear motion of the input member, and the reaction force generation means is elastically attached between the input member and the output member and is subjected to compressive deformation along the axis.

According to this configuration, the reaction force generation means can be disposed between the input member and the output member. Also, the reaction force generation means can be compressively deformed by means of the input member and the output member without need to use other members. Thus, the ratio of the amount of compressive deformation of the reaction force generation means to the amount of rectilinear motion of the input member can be increased. Furthermore, at least a portion of reaction force of the reaction force generation means can be imposed directly on the input member.

The above-mentioned configuration may be such that: in cooperation with other members, the output member defines on its opposite sides two cylinder chambers which are filled with liquid and whose volumes are variable; the output member has an orifice for establishing communication between the two cylinder chambers; and, in association with rectilinear motion of the output member, the liquid flows from one of the two cylinder chambers to the other cylinder chamber through the orifice.

According to this configuration, a damping force associated with flow of the liquid through the orifice acts on the output member in a direction opposite that of motion of the output member. Accordingly, the higher the operator's operating speed in operation of the operation means and thus the higher the speed of rectilinear motion of the input member, the larger the damping force imposed on the output member. Thus, an operational reaction force can be generated according to the operator's operating speed such that the higher the operator's operating speed, the larger the reaction force.

The above-mentioned configuration may be such that: a range in which the cam groove of the first transmission means extends along the axis and a range in which the cam groove of the second transmission means extends along the axis overlap each other at least partially as viewed along a circumferential direction about the axis.

According to this configuration, as compared with a structure in which a range in which the cam groove of the first transmission means extends along the axis and a range in which the cam groove of the second transmission means extends along the axis do not overlap each other as viewed along a circumferential direction about the axis, the distance along the axis between the cam groove engagement members of the first and second transmission means can be reduced. Thus, the axial length of the manipulation simulator can be reduced, whereby the manipulation simulator can be rendered compact.

The above-mentioned configuration may be such that: each of the cam groove engagement members has a shaft member which is fixed to a corresponding member and extends in a radial direction, and a cam roller which is rotatably supported by the shaft member and is rollably engaged with a wall surface of the corresponding cam groove.

According to this configuration, as compared with a structure in which the cam groove engagement member is not rollably engaged with the wall surface of the cam groove, friction between the cam groove engagement member and the wall surface of the cam groove can be reduced, whereby the conversion of motion between the motion of the motion transmission source and the motion of the motion transmission destination can be smoothly carried out.

The above-mentioned configuration may be such that: each of the cam groove engagement members has a guide roller which is rotatably supported by the shaft member and is rollably engaged with a wall surface of the corresponding guide groove extending along the direction of rectilinear motion of the input member.

According to this configuration, as compared with a structure which does not have the guide rollers rollably engaged with the wall surfaces of the corresponding guide grooves, the shaft members can be reliably moved along the direction of rectilinear motion of the input member, whereby the conversion of motion between the motion of the motion transmission source and the motion of the motion transmission destination can be smoothly carried out.

The above-mentioned configuration may be such that: the transmission means is configured to continuously and nonlinearly vary the ratio of the amount of motion of the output member to the amount of motion of the input member according to the amount of motion of the input member so that the ratio of the amount of motion of the output member to the amount of motion of the input member gradually increases with the amount of motion of the input member.

The above-mentioned configuration may be such that: the input member is supported by the housing in such a manner as to be rectilinearly movable along the axis within the housing, and the output member extends along the axis in such a state as to surround the housing and is supported by the housing in such a manner as to be rotatable about the axis.

The above-mentioned configuration may be such that: a plurality of cam grooves and cam groove engagement members are provided while being spaced apart from one another at equal intervals around the axis.

The above-mentioned configuration may be such that: the cam grooves are provided on the output member, and the cam groove engagement members are supported by the input member.

The above-mentioned configuration may be such that: the transmission means includes a deformable member which is deformed without involvement of volume change upon subjection to compression stress; the deformable member is deformed through rectilinear motion of the input member; and the deformed deformable member presses the output member, thereby rectilinearly moving the output member.

The above-mentioned configuration may be such that: the amount of deformation of the deformable member gradually increases with the amount of rectilinear motion of the input member.

The above-mentioned configuration may be such that: at least one of the first transmission means and the second transmission means is configured to continuously and nonlinearly vary the ratio of the amount of motion of a motion transmission destination member to the amount of motion of the motion transmission source member according to the amount of motion of the motion transmission source member so that the ratio of the amount of motion of the motion transmission destination member to the amount of motion of the motion transmission source member gradually increases with the amount of motion of the motion transmission source member.

The above-mentioned configuration may be such that: the second transmission means includes an eccentric cam for rectilinearly moving the output member in a direction perpendicular to the axis through rotation of the intermediate member about the axis.

The above-mentioned configuration may be such that: the intermediate member extends along the axis within the housing and is supported by the housing in such a manner as to be rotatable about the axis, and the input member and the output member are disposed along the axis within the intermediate member and are supported by the intermediate member in such a manner as to be rectilinearly movable along the axis.

The above-mentioned configuration may be such that: the first transmission means is configured to continuously and nonlinearly vary the ratio of the amount of motion of the intermediate member to the amount of motion of the input member according to the amount of motion of the input member so that the ratio of the amount of motion of the intermediate member to the amount of motion of the input member gradually increases with the amount of motion of the input member, and the second transmission means is configured to continuously and nonlinearly vary the ratio of the amount of motion of the output member to the amount of motion of the intermediate member according to the amount of motion of the intermediate member so that the ratio of the amount of motion of the output member to the amount of motion of the intermediate member gradually increases with the amount of motion of the intermediate member.

The above-mentioned configuration may be such that: a plurality of cam grooves and cam groove engagement members are provided while being spaced apart from one another at equal intervals around the axis.

The above-mentioned configuration may be such that: the rate of increase of the ratio of the amount of motion of the output member to the amount of motion of the intermediate member in association with increase of the amount of motion of the input member is higher than the rate of increase of the ratio of the amount of motion of the intermediate member to the amount of motion of the input member.

BEST MODE FOR CARRYING OUT THE INVENTION

Several preferred embodiments of the present invention will next be described in detail with reference to the appended drawings.

First Embodiment

Figure 1:
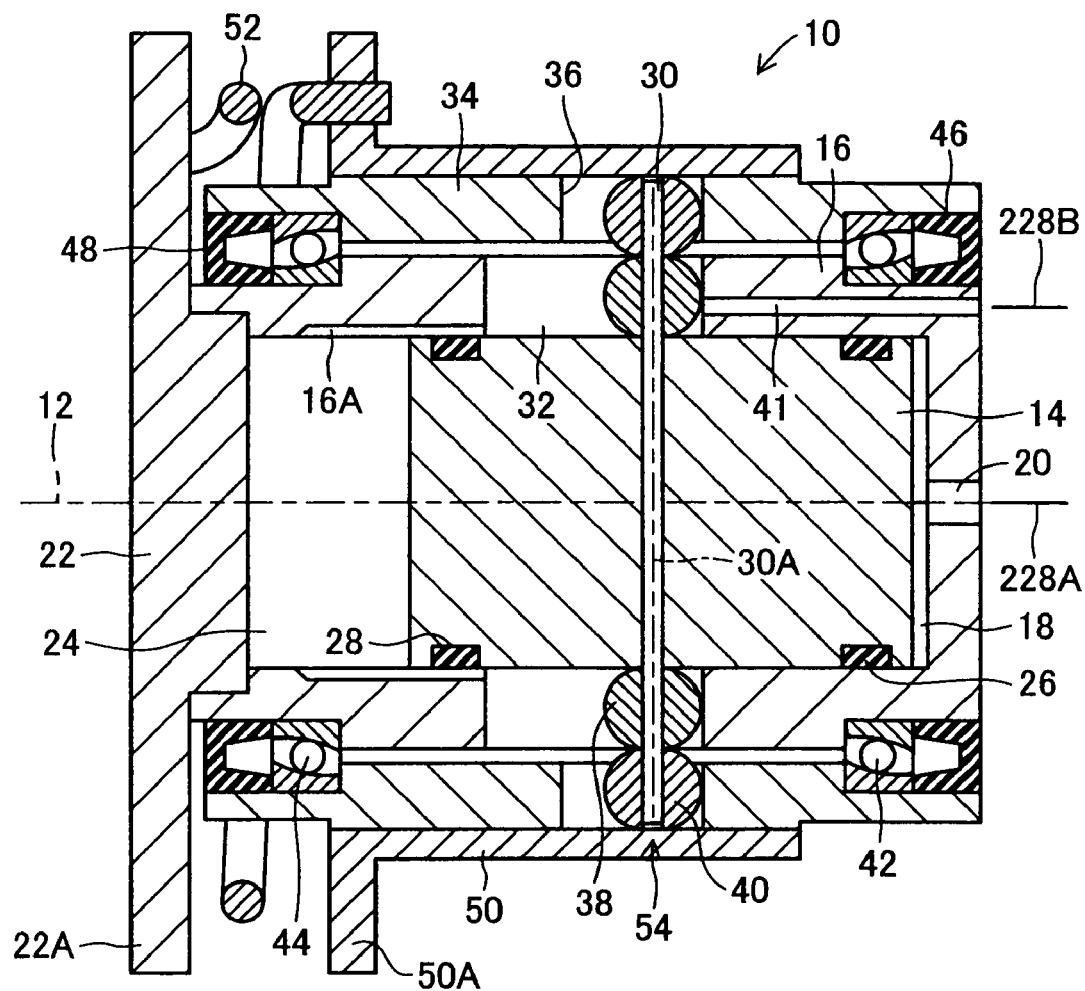
FIG. 1 is an axially-taken sectional view showing a first embodiment of a manipulation simulator according to the present invention and configured as a brake stroke simulator.
Figure 2:
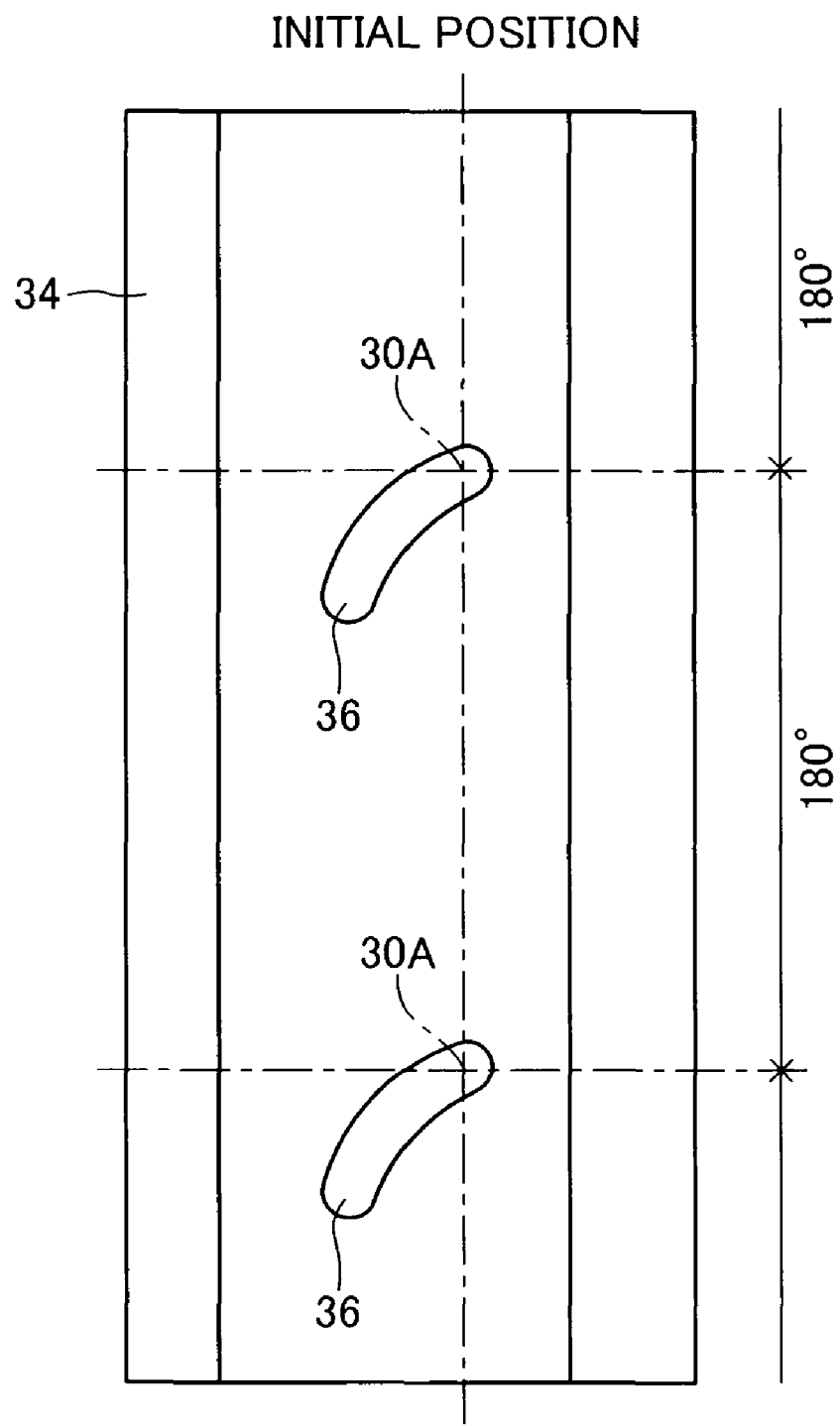
FIG. 2 is a development view in which an output rotor of the first embodiment is developed on a plane.
Figure 17:
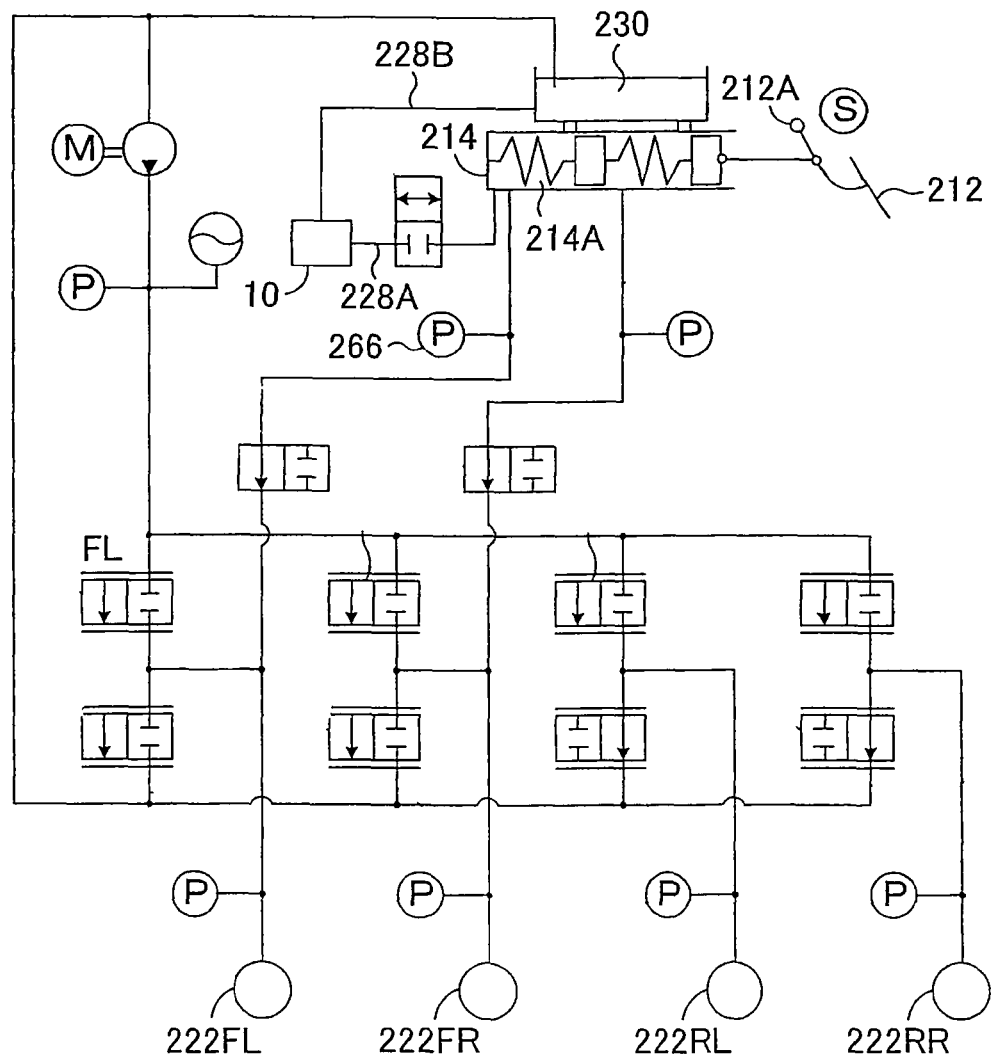
FIG. 17 is a schematic diagram showing a hydraulic brake apparatus which is one application example and to which the embodiments of the brake stroke simulator can be applied.

FIG. 1 is an axially-taken sectional view showing a first embodiment of a manipulation simulator according to the present invention and configured as a brake stroke simulator. FIG. 2 is a development view in which an output rotor of the first embodiment is developed on a plane. FIG. 17 is a schematic diagram showing a hydraulic brake apparatus to which the embodiments of the brake stroke simulator can be applied.

In FIGS. 1 and 2, reference numeral 10 denotes the overall brake stroke simulator. The stroke simulator 10 has an input piston 14, which can move rectilinearly along an axis 12 and serves as an input member. The input piston 14 is supported in a cylindrical housing 16, which is opened at its one end, such that the input piston 14 can reciprocate along the axis 12. In cooperation with the housing 16, the input piston 14 defines a first cylinder chamber 18 whose volume is variable. The housing 16 has an end wall located at its other end, and a communication hole 20 is provided in the end wall. The first cylinder chamber 18 is connected to and communicates with a first master cylinder chamber 214A via the communication hole 20 and a pipe 228A, whereby the first cylinder chamber 18 is filled with oil. As a liquid pressure in the first cylinder chamber 18 rises, the input piston 14 moves along the axis 12 leftward as viewed in FIG. 1, according to the liquid pressure.

An end cap 22 is fixed to an end of the housing 16 by means of press fit or the like. In cooperation with the housing 16 and the end cap 22, the input piston 14 defines a second cylinder chamber 24 whose volume is variable. Antifriction rings 26 and 28, such as TEFLON (registered trademark) rings, are attached to outer circumferences of respective opposite end portions of the input piston 14. The antifriction rings 26 and 28 reduce frictional resistance when the input piston 14 moves rectilinearly in relation to the housing 16. Also, the antifriction rings 26 and 28 provide a seal between the input piston 14 and the inner wall surface of the housing 16, thereby shutting off communication between the first cylinder chamber 18 and the second cylinder chamber 24. Although unillustrated in FIGS. 1 and 2, the stroke simulator 10 is fixed to a vehicle body by means of the housing 16 or the end cap 22 being attached to the vehicle body.

A load transmission rod 30 extends through the input piston 14 perpendicularly to the axis 12 and is fixed to the input piston 14 by means of press fit or the like. Opposite end portions of the load transmission rod 30 extend through respective guide grooves 32 provided in the cylindrical side wall of the housing 16 and into respective cam grooves 36 provided in an output rotor 34, which serves as an output member. The opposite end portions of the load transmission rod 30 support respective substantially spherical guide rollers 38 and cam rollers 40 in such a manner that the guide rollers 38 and the cam rollers 40 are rotatable about an axis 30A of the load transmission rod 30. The guide rollers 38 are rollably engaged with wall surfaces of the corresponding guide grooves 32. The cam rollers 40 are rollably engaged with wall surfaces of the corresponding cam grooves 36. The width of the guide grooves 32 and the width of the cam grooves 36 are set slightly greater than the maximum diameter of the guide rollers 38 and the maximum diameter of the cam rollers 40, respectively.

The two guide grooves 32 are spaced 180° apart from each other about the axis 12 and extend rectilinearly in parallel with the axis 12. Accordingly, the guide rollers 38 can only move in the respective guide grooves 32 rectilinearly along the axis 12, except for rotary motion about the load transmission rod 30. The two cam grooves 36 are also spaced 180° apart from each other about the axis 12. However, as shown in FIG. 2, the cam grooves 36 are curved and extend while being inclined with respect to the axis 12 and the circumferential direction. Accordingly, each of the cam rollers 40 can only move in the cam groove 36 along a trajectory of motion which is curved and inclined with respect to the axis 12 and the circumferential direction, except for rotary motion about the load transmission rod 30.

The guide grooves 32 communicate at all times with the second cylinder chamber 24 via a plurality of grooves 16A which are provided in the inner wall surface of the housing 16 and extend along the axis 12. The guide grooves 32 also communicate at all times with a reservoir 230 via a communication hole 41 provided in the housing 16 and extending along the axis 12, and a pipe 228B. The cam grooves 36 communicate at all times with the guide grooves 32 via a space between the housing 16 and the output rotor 34. Accordingly, the second cylinder chamber 24, the guide grooves 32, and the cam grooves 36 are also filled with oil, so that the oil also functions as a lubricant for rotation and rolling of the guide rollers 38 and the cam rollers 40.

The output rotor 34 assumes the form of a cylinder which is loosely fitted to the cylindrical side wall of the housing 16 and extends along the axis 12. The output rotor 34 is supported at its axially opposite end portions by angular bearings 42 and 44 provided between the same and the housing 16, in such a manner as to be rotatable about the axis 12 in relation to the housing 16. The angular bearings 42 and 44 allow the output rotor 34 to rotate about the axis 12 in relation to the housing 16, but prevent the output rotor 34 from moving along the axis 12 in relation to the housing 16. Cup seals 46 and 48, which extend annularly about the axis 12, are attached to the angular bearings 42 and 44, respectively, from axially outside. The cup seals 46 and 48 are formed of an elastic material such as rubber. While allowing the output rotor 34 to rotate about the axis 12 in relation to the housing 16, the cup seals 46 and 48 prevent entry of foreign matter, such as dust and muddy water, into the angular bearings 42 and 44.

A cylindrical cover 50 having a flange portion 50A is fixed to the circumference of the output rotor 34 by means of press fit or the like. The cover 50 is tightly fitted to the circumference of the output rotor 34 and covers the cam grooves 36 from the outside, thereby shutting off the cam grooves 36 from the outside. The flange portion 50A projects radially outward from one end of the cover 50 and extends in the circumferential direction. The flange portion 50A supports one end of a torsion spring 52, which serves as a reaction force generation member. The torsion spring 52 extends in the form of a coil around one end of the output rotor 34, and the other end of the torsion spring 52 is fixed to a flange portion 22A of the end cap 22. Accordingly, when the output rotor 34 rotates about the axis 12 in relation to the end cap 22 to thereby deform the torsion spring 52 in the rotational direction, the torsion spring 52 linearly generates a reaction force; i.e., a reaction torque, in a rotational direction (hereinafter referred to as a "rotational reaction force") in proportion to the amount of its deformation.

Thus, in the illustrated first embodiment, the load transmission rod 30, the guide grooves 32, the cam grooves 36, the guide rollers 38, etc. cooperatively function as a transmission means 54 for converting a rectilinear motion along the axis 12 of the input piston 14 to a rotary motion about the axis 12; transmitting the rotary motion to the output rotor 34; deforming the torsion spring 52 via the output rotor 34, etc.; and transmitting the rotational reaction force of the torsion spring 52 to the input piston 14 as a reaction force which acts on the input piston 14 along the axis 12 in a direction opposite the direction of rectilinear motion of the input piston 14.

Particularly, the transmission means 54 in the present embodiment varies the ratio of the amount of rotary motion of the output rotor 34 to the amount of rectilinear motion of the input piston 14 according to the amount of rectilinear motion of the input piston 14 such that the ratio of the amount of rotary motion of the output rotor 34 to the amount of rectilinear motion of the input piston 14 gradually increases with the amount of rectilinear motion of the input piston 14, thereby varying the ratio of the amount of deformation of the torsion spring 52 to the amount of rectilinear motion along the axis 12 of the input piston 14 according to the amount of rectilinear motion of the input piston 14 such that the ratio of the amount of deformation of the torsion spring 52 to the amount of rectilinear motion along the axis 12 of the input piston 14 gradually increases with the amount of rectilinear motion of the input piston 14.

When a driver applies a tread force to a brake pedal 212, the brake pedal 212 pivotally moves about a pivot 212A, whereby a pedal section performs a stroke motion; a master cylinder 214 converts the tread force applied to the brake pedal 212 to a liquid pressure; and the liquid pressure is transmitted to the first cylinder chamber 18 via the pipe 228A and the communication hole 20, whereby a load along the axis 12 is transmitted to the input piston 14. The transmission of tread load and the conversion of tread load to liquid pressure also apply to other embodiments to be described later.

The reaction force of the torsion spring 52 transmitted to the input piston 14 by the transmission means 54 is converted to a liquid pressure in the first cylinder chamber 18 by the input piston 14. The liquid pressure is transmitted to the first master cylinder chamber 214A via the communication hole 20 and the pipe 228A and is converted to a load directed opposite the treading direction by the master cylinder 214 and the brake pedal 212. Thus, the driver receives a reaction force directed opposite the treading direction. The transmission of reaction load and the conversion to liquid pressure also apply to other embodiments to be described later.

Particularly, in the first embodiment, the two guide grooves 32 and the two cam grooves 36 are respectively spaced 180° apart from each other about the axis 12. The right ends of the guide grooves 32 and the right ends of the cam grooves 36 as viewed in FIG. 1 are located at the same axial position along the axis 12. At the time of nonbraking when the master cylinder 214 does not apply liquid pressure to the first cylinder chamber 18, a spring force of the torsion spring 52 is applied to the output rotor 34 via the cover 50, whereby the guide rollers 38 and the cam rollers 40 are positioned at their initial positions, where the guide rollers 38 and the cam rollers 40 are in contact with the right ends of the guide grooves 32 and the right ends of the cam grooves 36, respectively, as viewed in FIG. 1. When the guide rollers 38 and the cam rollers 40 are positioned at their initial positions, the input piston 14 is positioned at its initial position, where the volume of the first cylinder chamber 18 becomes minimum, and the volume of the second cylinder chamber 24 becomes maximum.

Figure 18:
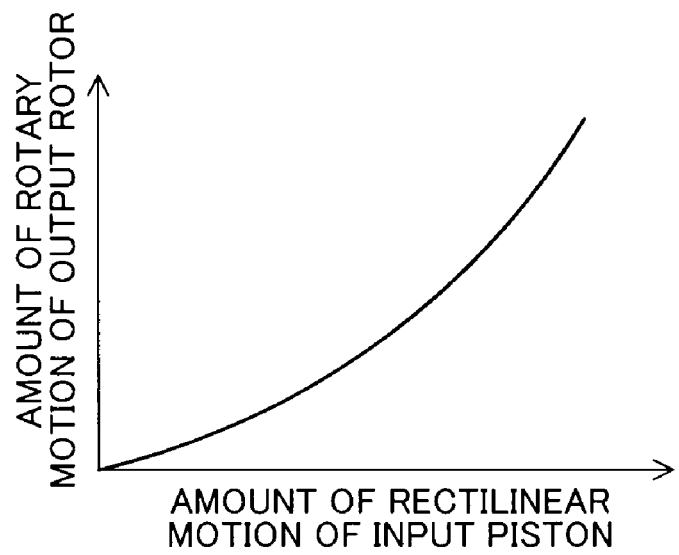
FIG. 18 is a graph showing the relation between the amount of rectilinear motion of an input piston and the amount of rotary motion of an output rotor.

Each of the cam grooves 36 is curved and extends such that the angle of inclination with respect to the circumferential direction reduces gradually in the course from its right end toward its left end as viewed in FIG. 2. Accordingly, as shown in FIG. 18, as the input piston 14 moves leftward as viewed in FIG. 1 along the axis 12, the transmission means 54 gradually increases the ratio of the amount of rotary motion of the output rotor 34 to the amount of rectilinear motion along the axis 12 of the input piston 14, thereby gradually increasing the ratio of the amount of deformation of the torsion spring 52 to the amount of rectilinear motion along the axis 12 of the input piston 14.

In the thus-configured first embodiment, when a liquid pressure in the master cylinder 214 increases, and thus the input piston 14 moves rectilinearly leftward as viewed in FIG. 1 along the axis 12, the transmission means 54 converts the rectilinear motion of the input piston 14 to a rotary motion about the axis 12 and transmits the rotary motion to the output rotor 34. The rotation of the output rotor 34 deforms the torsion spring 52. The transmission means 54 transmits a rotational reaction force of the torsion spring 52 from the output rotor 34 to the input piston 14 as a reaction force along the axis 12. The input piston 14 converts the reaction force to a liquid pressure in the first cylinder chamber 18. The liquid pressure is transmitted to the first master cylinder chamber 214A via the communication hole 20 and the pipe 228A and is converted to a load directed opposite the treading direction by the master cylinder 214 and the brake pedal 212. Thus, the driver receives a reaction force against the treading operation.

Figure 19:
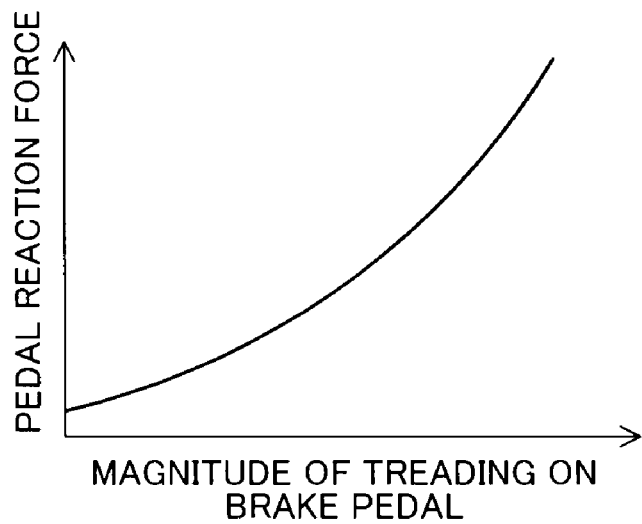
FIG. 19 is a graph showing the relation between the magnitude of treading on a brake pedal and a pedal reaction force.

In this case, as the magnitude of treading on the brake pedal 212 increases, the transmission means 54 gradually increases the ratio of the amount of deformation of the torsion spring 52 to the amount of rectilinear motion along the axis 12 of the input piston 14. Thus, the ratio of a pedal reaction force to the magnitude of treading on the brake pedal 212 increases gradually. Accordingly, even though the torsion spring 52 itself has a linear spring characteristic, as shown in FIG. 19, the characteristic of pedal reaction force vs. the magnitude of treading on the brake pedal 212 becomes a continuous nonlinear characteristic.

When, in association with increase in the magnitude of treading on the brake pedal 212, the input piston 14 moves rectilinearly leftward as viewed in FIG. 1 along the axis 12, the volume of the second cylinder chamber 24 reduces. Thus, oil in the second cylinder chamber 24 flows to the reservoir 230 via the grooves 16A, the guide grooves 32, the communication hole 41, and the pipe 228B. On the other hand, when, in association with decrease in the magnitude of treading on the brake pedal 212, the input piston 14 moves rectilinearly rightward as viewed in FIG. 1 along the axis 12, the volume of the second cylinder chamber 24 increases. Thus, oil in the reservoir 230 flows to the second cylinder chamber 24 via the pipe 228B, the communication hole 41, the guide grooves 32, and the grooves 16A.

Thus, according to the illustrated first embodiment, even in a situation in which communication is shut off between the master cylinder 214 and wheel cylinders 222FL and 222FR, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, according to the illustrated first embodiment, the transmission means 54 performs motion conversion only between the rectilinear motion of the input piston 14 and the rotary motion of the output rotor 34. Thus, for example, as compared with third to eighth embodiments which are described later and in which both conversion from a rectilinear motion to a rotary motion and conversion from a rotary motion to a rectilinear motion are performed, the structure of the brake stroke simulator 10 can be simplified.

Also, according to the illustrated first embodiment, the output rotor 34 is fitted to the input piston 14 in such a state that the output rotor 34 surrounds the housing 16, and the rotation of the output rotor 34 deforms the torsion spring 52, which serves as reaction force generation means. Thus, as compared with the case where the reaction force generation means is disposed along the axis 12 and is deformed along the axis 12, the axial length of the stroke simulator 10 can be reduced.

Also, according to the illustrated first embodiment, the input piston 14 is supported by the housing 16 in such a manner as to be reciprocally movable within the housing 16, and the output rotor 34 is supported by the housing 16 in such a manner as to be rotatable at the outside of the housing 16. That is, the input piston 14 and the output rotor 34 are not engaged directly with each other for relative motion. Thus, as compared with fourth to eighth embodiments to be described later, wear of members associated with frictional motion of the members is reduced, so that durability can be improved.

Second Embodiment

Figure 3:
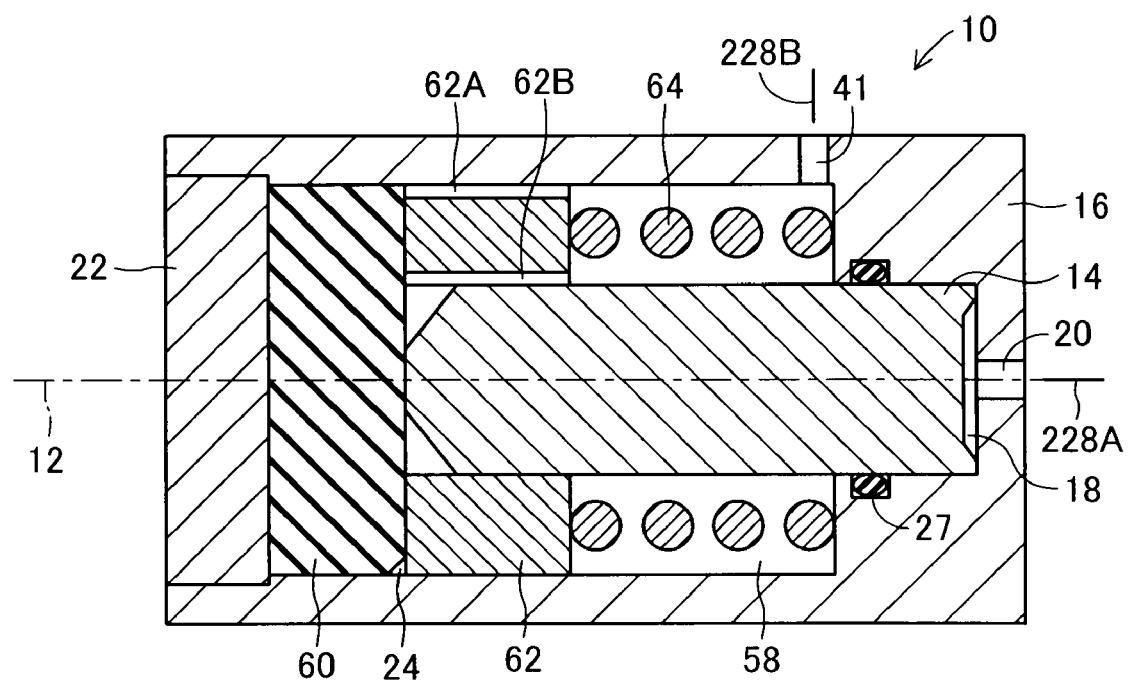
FIG. 3 is an axially-taken sectional view showing a second embodiment of the manipulation simulator according to the present invention and configured as a brake stroke simulator.

FIG. 3 is an axially-taken sectional view showing a second embodiment of the manipulation simulator according to the present invention and configured as a brake stroke simulator. In FIG. 3, members similar to those shown in FIG. 1 are denoted by the same reference numerals appearing in FIG. 1.

In the second embodiment, the input piston 14 is supported at its base portion; i.e., at its end portion on a side toward the first cylinder chamber 18, by the housing 16 in such a manner as to be reciprocally movable along the axis 12. An O-ring seal 27 is attached to the inner wall surface of the housing 16, and rings corresponding to the antifriction rings 26 and 28 in the first embodiment are not provided. The input piston 14 is movably fitted to the housing 16 at its portion other than the base portion, and a spring chamber 58, which communicates with the second cylinder chamber 24, is defined between the housing 16 and the portion of the input piston 14. The spring chamber 58 communicates with the reservoir 230 at all times via the communication hole 41 and the pipe 228B. A reaction disk 60, which serves as a deformable member, is disposed within the second cylinder chamber 24 in such a manner as to fill the second cylinder chamber 24. The reaction disk 60 is formed of a material which is deformed substantially without involvement of volume change upon subjection to compression stress.

A distal end portion of the input piston 14; i.e., an end portion on a side toward the second cylinder chamber 24, assumes substantially the form of a truncated cone and is in contact with the reaction disk 60. A cylindrical load transmission member 62 is disposed around the distal end portion of the input piston 14. The cylindrical load transmission member 62 is substantially formed of a rigid body and functions as an output member. The load transmission member 62 is fitted to the housing 16 and the input piston 14 in such a manner as to be displaceable along the axis 12 in relation to the housing 16 and to the input piston 14. The load transmission member 62 has a plurality of grooves 62A and 62B extending along the axis 12 and provided on its outer circumferential surface and its inner circumferential surface, respectively. A compression coil spring 64, which serves as reaction force generation means, is disposed in the spring chamber 58 in such a state as to surround the input piston 14. The compression coil spring 64 is elastically attached between the load transmission member 62 and the housing 16.

In the second embodiment, when the input piston 14 moves leftward as viewed in FIG. 3 along the axis 12 and compressively deforms the reaction disk 60, the reaction disk 60 presses the load transmission member 62. Thus, the load transmission member 62 is moved along the axis 12 in such a direction as to increase the amount of compressive deformation of the compression coil spring 64; i.e., in a direction opposite the moving direction of the input piston 14. As the input piston 14 moves leftward as viewed in FIG. 3 along the axis 12, the amount of compressive deformation of the reaction disk 60 gradually increases. Accordingly, the amount of movement of the load transmission member 62 in such a direction as to increase the amount of compressive deformation of the compressing coil spring 64 increases gradually.

Figure 5:
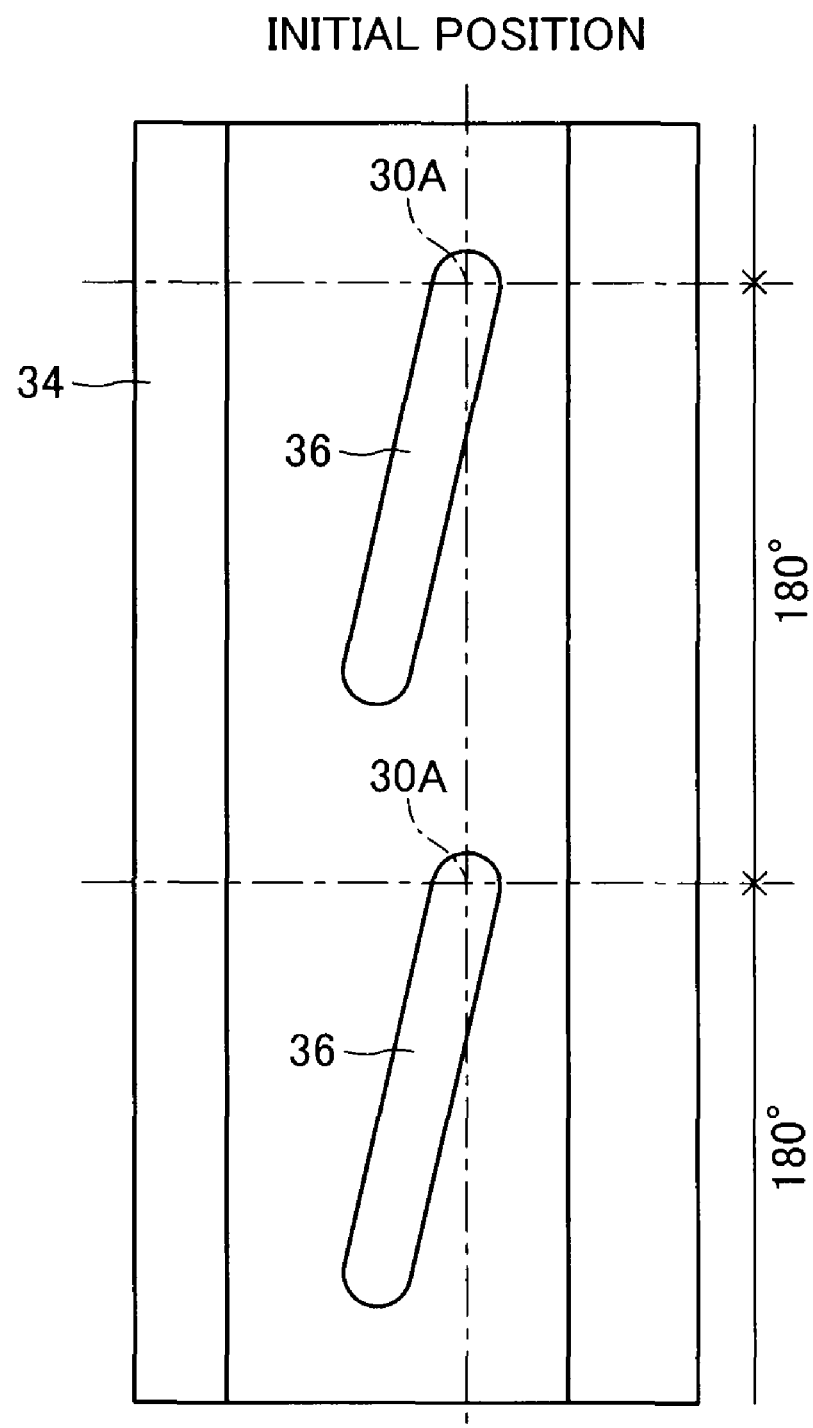
FIG. 5 is a development view in which an output rotor of the third embodiment is developed on a plane.

Accordingly, in cooperation with the housing 16, etc., the reaction disk 60 and the distal end portion of the input piston 14 function as transmission means for converting a rectilinear motion along the axis 12 of the input piston 14 to a reverse rectilinear motion along the axis 12 and transmitting the reverse rectilinear motion to the load transmission member 62, and gradually increase the ratio of the amount of rectilinear motion of the load transmission member 62 to the amount of rectilinear motion along the axis 12 of the input piston 14 as the input piston 14 moves leftward as viewed in FIG. 5 along the axis 12, thereby gradually increasing the ratio of the amount of compressive deformation of the compression coil spring 64 to the amount of rectilinear motion along the axis 12 of the input piston 14.

At the time of nonbraking; i.e., when the master cylinder 214 does not apply liquid pressure to the first cylinder chamber 18, the amount of deformation of the reaction disk 60 caused by the input piston 14 becomes minimum. Accordingly, the amount of compressive deformation of the compression coil spring 64 caused by the load transmission member 62 becomes minimum. Also, the input piston 14 is positioned at its initial position, where the right end of the input piston 14 as viewed in FIG. 5 is in contact with the end wall of the housing 16.

In the thus-configured second embodiment, the reaction disk 60 transmits a rectilinear motion along the axis 12 of the input piston 14 to the load transmission member 62 as a reverse rectilinear motion. Thus, the load transmission member 62 compressively deforms the compression coil spring 64, whereby the compression coil spring 64 generates a reaction force. The reaction force of the compression coil spring 64 is transmitted from the load transmission member 62 to the input piston 14 via the reaction disk 60 as stress which acts on the input piston 14 in the reverse direction.

Thus, according to the illustrated second embodiment, similar to the above-described first embodiment, even in a situation in which communication is shut off between the master cylinder and the wheel cylinders, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, the illustrated second embodiment does not require members, such as cam grooves and cam rings, for converting a rectilinear motion of the input piston 14 to a rotary motion. Also, the reaction disk 60 converts a rectilinear motion of the input piston 14 to a reverse rectilinear motion of the load transmission member 62. Thus, as compared with other embodiments in which a rectilinear motion of the input piston 14 is converted to a rotary motion, the structure of the stroke simulator 10 can be simplified to a far greater extent.

Also, according to the illustrated second embodiment, the load transmission member 62, which serves as an output member, and the compression coil spring 64, which serves as reaction force generation means, are fitted to the input piston 14 in such a manner as to be aligned on the axis 12 and to surround the input piston 14. Thus, for example, as compared with the structure in which the load transmission member 62 and the input piston 14 are disposed on opposite sides of the reaction disk 60 while being aligned on the axis 12, the length of the stroke simulator 10 can be reduced to a far greater extent, so that the stroke simulator can be rendered compact.

Third Embodiment

Figure 4:
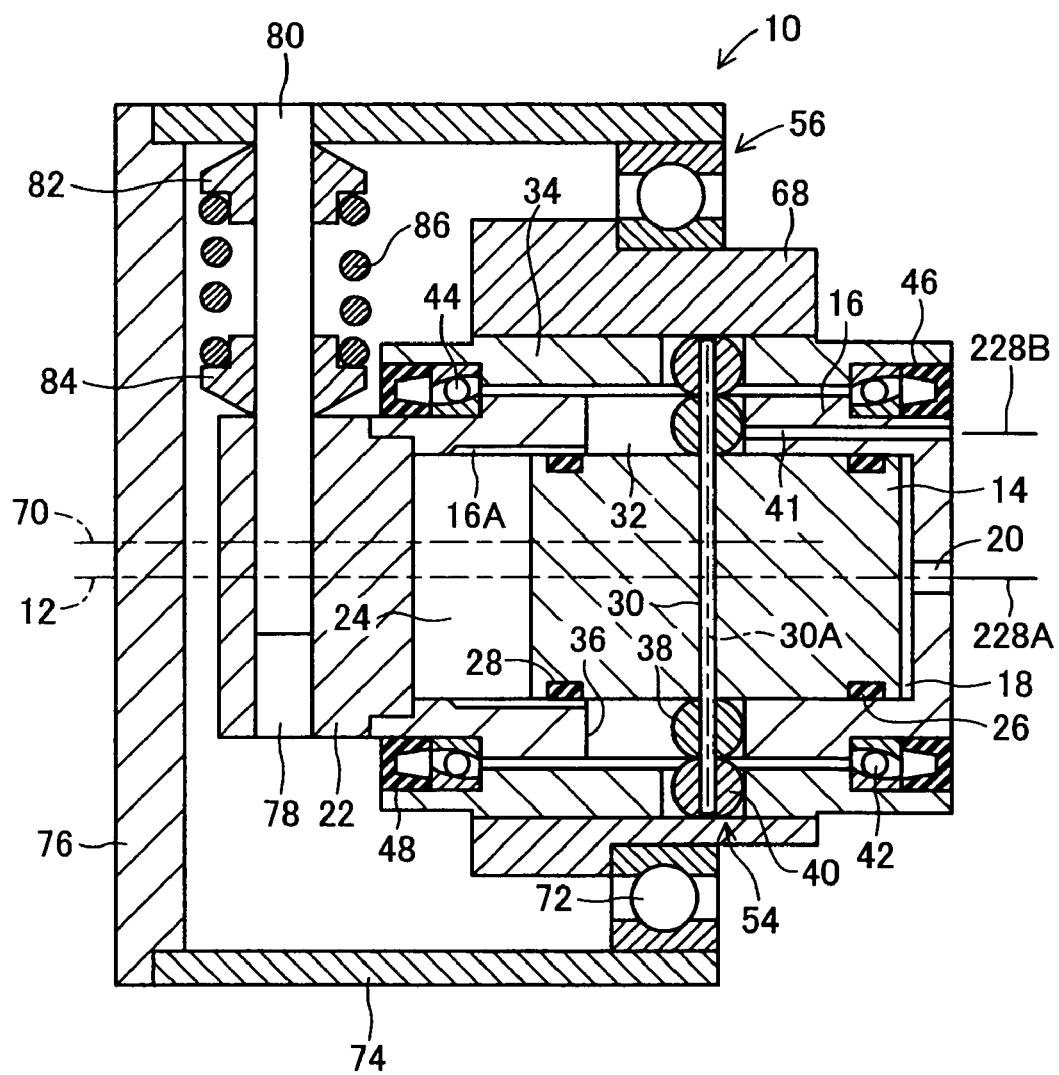
FIG. 4 is an axially-taken sectional view showing a third embodiment of the manipulation simulator according to the present invention and configured as a brake stroke simulator.

FIG. 4 is an axially-taken sectional view showing a third embodiment of the manipulation simulator according to the present invention and configured as a brake stroke simulator. FIG. 5 is a development view in which an output rotor of the third embodiment is developed on a plane. In FIGS. 4 and 5, members similar to those shown in FIGS. 1 and 2 are denoted by the same reference numerals appearing in FIGS. 1 and 2. This convention also applies to other embodiments to be described later.

In the third embodiment, an eccentric cam member 68 is fitted to the output rotor 34 from the radial outside and is fixed to the output rotor 34 by means of press fit or the like. The eccentric cam member 68 has a cylindrical outer surface whose axis 70 is parallelly deviated from the axis 12. The inner race of a ball bearing 72 is fixed to a small diameter portion of the eccentric cam member 68 while being in contact with a large diameter portion of the eccentric cam member 68. The outer race of the ball bearing 72 is fixed, by means of press fit or the like, to the inner circumferential surface of one end portion of a cylindrical member 74, which extends along the axis 70 in such a manner as to surround the eccentric cam member 68. An end cap 76 is fixed to the other end of the cylindrical member 74 by means of press fit or the like.

The end cap 22 has a guide hole 78 extending perpendicularly to the axis 12. The guide hole 78 supports a radially inner end portion of a radially extending spring support rod 80 such that the spring support rod 80 can move reciprocally. A radially outer end portion of the spring support rod 80 is fixed to the other end portion of the cylindrical member 74 by means of press fit or the like. Accordingly, the cylindrical member 74, the end cap 76, and the spring support rod 80 are supported in such a manner as to be rectilinearly movable in relation to the housing 16 and the end cap 22 without rotation in relation to the housing 16 and the end cap 22.

Two spring seat members 82 and 84 are fitted to the spring support rod 80 at respective positions located between the end cap 22 and the cylindrical member 74. The spring seat members 82 and 84 are fitted to the spring support rod 80 in such a manner as to be displaceable in relation to the spring support rod 80 along the longitudinal direction of the spring support rod 80. However, the spring seat member 82 located on a side toward the cylindrical member 74 may be fixed to the spring support rod 80 or the cylindrical member 74. A compression coil spring 86, which serves as a reaction force generation member, is elastically attached between the spring seat members 82 and 84 in such a state as to surround the spring support rod 80.

Particularly, in the illustrated embodiment, the direction of eccentricity of the axis 70 with respect to the axis 12; in other words, the direction of eccentricity of the eccentric cam member 68, is toward the outer end of the support rod 80 along the support rod 80. Accordingly, when the input piston 14 is positioned at its initial position, and the guide rollers 38 and the cam rollers 40 are positioned at their initial positions of the guide grooves 32 and at their initial positions of the cam grooves 36, respectively, the distance between the end cap 22 and the cylindrical member 74 as measured along the spring support rod 80 becomes maximum. Thus, the distance between the spring seat members 82 and 84 becomes maximum, so that the amount of compressive deformation of the compression coil spring 86 becomes minimum.

When, in association with rotation of the output rotor 34, the eccentric cam member 68 rotates about the axis 12 such that the axis 70 rotates about the axis 12, the cylindrical member 74 moves rectilinearly downward in FIG. 4 along the support rod 80. Accordingly, the distance between the end cap 22 and the cylindrical member 74 as measured along the spring support rod 80 reduces. The rate of reduction of the distance increases with the amount of rotation of the eccentric cam member 68. Thus, as shown in FIG. 5, the cam grooves 36 provided in the output rotor 34 extend at a fixed angle with respect to the axis 12 and at a fixed angle with respect to the circumferential direction. Other structural features are similar to those of the above-described first embodiment.

In the third embodiment, the transmission means 54 functions as first transmission means for transmitting a rectilinear motion along the axis 12 of the input piston 14 to the output rotor 34 and the eccentric cam member 68 as a rotary motion. The rotary motion of the eccentric cam member 68 is converted to a relative rectilinear motion along the support rod 80 between the end cap 22 and the cylindrical member 74, and the rectilinear motion is transmitted to the cylindrical member 74. Accordingly, the eccentric cam member 68, the ball bearing 72, the cylindrical member 74, the spring support rod 80, etc. constitute second transmission means 56 for converting a rotary motion of the output rotor 34 to a rectilinear motion of the cylindrical member 74. The output rotor 34 functions as an intermediate member, and the cylindrical member 74 functions as an output member for compressively deforming the compression coil spring 86, which serves as reaction force generation means.

The second transmission means 56 transmits a reaction force generated by the compression coil spring 86 to the eccentric cam member 68 and the output rotor 34 as a reaction torque about the axis 12. The first transmission means 54 transmits a reaction force torque transmitted to the output rotor 34 to the input piston 14 as a reaction load along the axis 12.

Also, in the third embodiment, as the input piston 14 moves leftward as viewed in FIG. 4 along the axis 12, the second transmission means 56 gradually increases the ratio of the amount of such a relative rectilinear motion between the spring seat members 72 and 74 to approach each other, to the amount of rectilinear motion along the axis 12 of the input piston 14, thereby gradually increasing the ratio of the amount of compressive deformation of the compression coil spring 76 to the amount of rectilinear motion along the axis 12 of the input piston 14.

In the thus-configured third embodiment, when a rectilinear motion of the input piston 14 is converted to a rotary motion about the axis 12, and the rotary motion is transmitted to the output rotor 34, as mentioned above, the action of the eccentric cam member 68 causes reduction in the distance between the end cap 22 and the cylindrical member 64 as measured along the spring support rod 80. Accordingly, the compression coil spring 86 is compressively deformed, thereby generating a reaction force. The reaction force of the compression coil spring 86 is transmitted from the cylindrical member 74 to the output rotor 34 via the ball bearing 72 and the eccentric cam member 68 and is then transmitted from the output rotor 34 to the input piston 14 as a reaction force along the axis 12.

Thus, according to the illustrated third embodiment, similar to the above-described first embodiment, even in a situation in which communication is shut off between the master cylinder 214 and the wheel cylinders 222FL and 222FR, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, according to the illustrated third embodiment, the first transmission means 54 converts a rectilinear motion along the axis 12 of the input piston 14 to a rotary motion of the output rotor 34, and the second transmission means 56 converts the rotary motion of the output rotor 34 to a rectilinear motion of the cylindrical member 74 perpendicular to the axis 12. Therefore, the compression coil spring 86, which serves as reaction force generation means, can be disposed in such a manner as to extend perpendicularly to the axis 12. Thus, as compared with other embodiments which are described later and in which two transmission means each similar to the first transmission means 54 are disposed along the axis 12, the length of the stroke simulator 10 along the axis 12 can be reduced.

Also, according to the illustrated third embodiment, the second transmission means 56 performs motion conversion such that the ratio of the amount of rectilinear motion of the cylindrical member 74 to the amount of rectilinear motion of the input piston 14 increases gradually with the amount of rectilinear motion of the input piston 14. Accordingly, the cam grooves 36 for converting a rectilinear motion of the input piston 14 to a rotary motion of the output rotor 34 can extend in such a manner as to form a fixed angle with respect to the axis 12 and a fixed angle with respect to the circumferential direction. Therefore, as compared with the above-described first embodiment, machining of the cam grooves 36 can be simplified.

Fourth Embodiment

Figure 6:
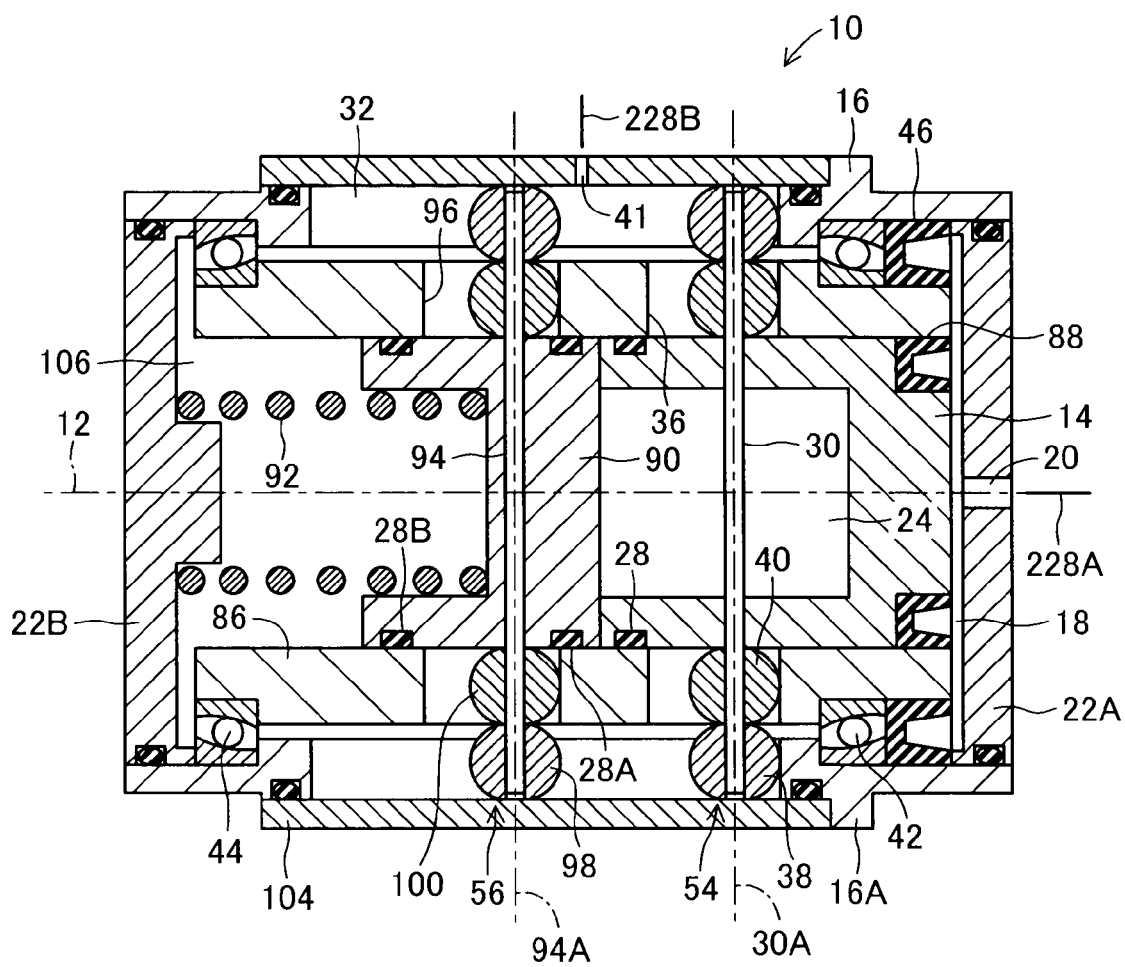
FIG. 6 is an axially-taken sectional view showing a fourth embodiment of the manipulation simulator according to the present invention and configured as a brake stroke simulator.
Figure 7:
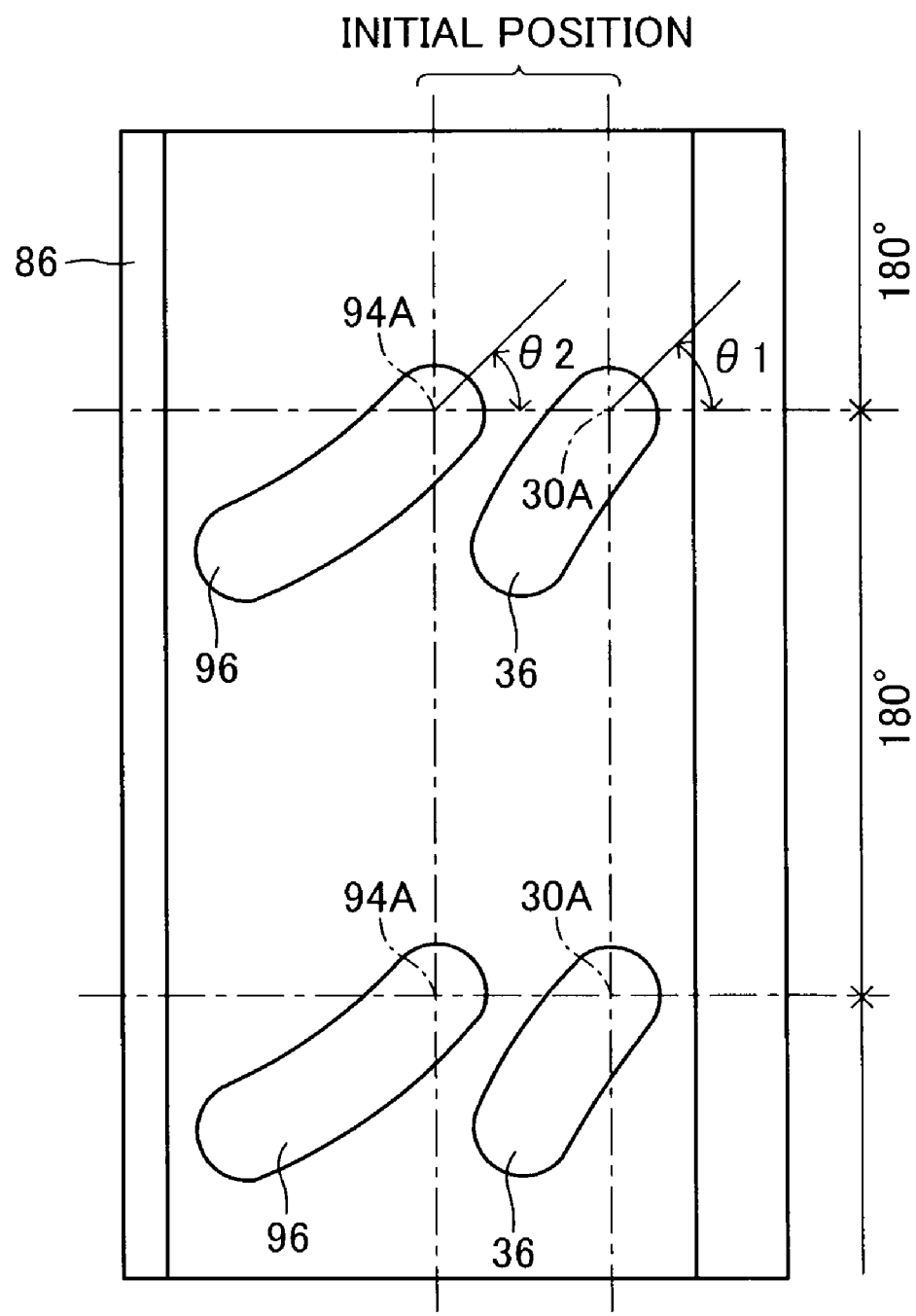
FIG. 7 is a development view in which an intermediate rotor of the fourth embodiment is developed on a plane.

FIG. 6 is an axially-taken sectional view showing a fourth embodiment of the manipulation simulator according to the present invention and configured as a brake stroke simulator. FIG. 7 is a development view in which an intermediate rotor of the fourth embodiment is developed on a plane.

In the fourth embodiment, the housing 16 is composed of a cylindrical body 16A and end caps 22A and 22B, which are fixed to respective opposite ends of the cylindrical body 16A by means of press fit or the like. The communication hole 20 is provided in the end cap 22A. A cylindrical intermediate rotor 86, which functions as an intermediate member, is disposed in the housing 16 and extends along the axis 12. The input piston 14 is fitted to the inside of the intermediate rotor 86 and is supported by the intermediate rotor 86 in such a manner as to be reciprocally movable along the axis 12 in relation to the intermediate rotor 86.

The angular bearings 42 and 44 are disposed between a cylindrical portion of the housing 16 and opposite end portions of the intermediate rotor 86. The angular bearings 42 and 44 allow the intermediate rotor 86 to rotate about the axis 12 in relation to the housing 16 and the input piston 14, but prevent the intermediate rotor 86 from moving along the axis 12 in relation to the housing 16 and the input piston 14. The antifriction rings 26 used in the first and second embodiments are replaced with a cup seal 88. The cup seal 88 provides seal between the input piston 14 and the intermediate rotor 86 while allowing relative motion therebetween.

An output piston 90 is fitted to the inside of the intermediate rotor 86 and is disposed between the end cap 22B and the input piston 14. The output piston 90 is supported by the intermediate rotor 86 in such a manner as to be reciprocally movable along the axis 12 in relation to the intermediate rotor 86. Antifriction rings 28A and 28B similar to the antifriction ring 28 are attached to the outer circumferential surfaces of opposite end portions, respectively, of the output piston 90. In the illustrated embodiment, each of the input piston 14 and the output piston 90 has a cup-like sectional shape which opens toward the end cap 22B. A compression coil spring 92, which serves as reaction force generation means, is disposed in a third cylinder chamber 106 between the output piston 90 and the end cap 22B.

A load transmission rod 94 extends through the output piston 90 perpendicularly to the axis 12 and is fixed to the output piston 90 by means of press fit or the like. An axis 94A of the load transmission rod 94 extends in parallel with the axis 30A of the load transmission rod 30. However, the axis 94A may be inclined with respect to the axis 30A as viewed from the direction of the axis 12 so long as the axis 94A is perpendicular to the axis 12. Opposite end portions of the load transmission rod 94 extend through respective cam grooves 96 provided in the intermediate rotor 86 and into the respective guide grooves 32 provided in the body 16A of the housing 16. The opposite end portions of the load transmission rod 94 support respective guide rollers 98 and respective cam rollers 100 such that the guide rollers 98 and the cam rollers 100 are rotatable about an axis 94A of the load transmission rod 94. The guide rollers 98 are rollably engaged with wall surfaces of the corresponding guide grooves 32. The cam rollers 100 are rollably engaged with wall surfaces of the corresponding cam grooves 96 provided in the intermediate roller 86. Even in the present embodiment, the width of the guide grooves 32 and the width of the cam grooves 96 are set slightly greater than the maximum diameter of the guide rollers 98 and the maximum diameter of the cam rollers 100, respectively.

The guide grooves 32 extend along the axis 12 longer than the guide grooves 32 of the above-described first and third embodiments so as to function as common guide grooves for the guide rollers 38 and 98. A cylindrical cover 104 is fixed to the outer circumference of the body 16A of the housing 16 by means of press fit or the like. The cover 104 is tightly fitted to the body 16A, thereby shutting off the guide grooves 32 from the outside. The cam grooves 36 and 96 communicate at all times with the guide grooves 32 via a gap between the intermediate rotor 86 and the body 16A of the housing 16. The guide grooves 32 communicate at all times with the reservoir 230 via the communication hole 41 provided in the cover 104, and the pipe 228B.

As shown in FIG. 7, as in the case of the cam grooves 36 of the first embodiment described above, the cam grooves 36 extend while being inclined with respect to the axis 12 and the circumferential direction. Also, each of the cam grooves 36 is curved and extends such that the angle of inclination with respect to the circumferential direction reduces gradually in the course from its right end toward its left end as viewed in FIG. 7. By contrast, although the cam grooves 96 extend while being inclined with respect to the axis 12 and the circumferential direction, each of the cam grooves 96 is curved in the reverse direction of the cam groove 36 and extends such that the angle of inclination with respect to the circumferential direction increases gradually in the course from its right end toward its left end as viewed in FIG. 7.

A right end portion as viewed in FIG. 7 of each of the cam grooves 96 and a left end portion as viewed in FIG. 7 of each of the cam grooves 36 overlap with each other with respect to axial position. Also, the extending length of the cam grooves 96 along the axis 12 is set longer than that of the cam grooves 36. Furthermore, inclination angles $\theta 1$ and $\theta 2$ with respect to the axis 12 of right end portions as viewed in FIG. 7 of the cam grooves 36 and 96, respectively, assume the same angle. As is apparent from FIGS. 2 and 7, the degree of curve of the cam grooves 36 and 96 is set smaller than that of the cam grooves 36 in the above-described first embodiment.

As shown in FIG. 6, at the time of nonbraking, the cam rollers 40 and 100 are positioned at their initial positions, where the cam rollers 40 and 100 are in contact with the right ends as viewed in FIG. 7 of the cam grooves 36 and 96, respectively. When the cam rollers 40 and 100 are positioned at their initial positions, the input piston 14 is positioned at its initial position, where the volume of the first cylinder chamber 18 becomes minimum, and the output piston 90 is positioned at its initial position, where the output piston 90 is in contact with the input piston 14. Thus, the amount of compressive deformation of the compression coil spring 92 becomes minimum. Also, at the time of nonbraking, a spring force of the compression coil spring 92 urges the load transmission rods 30 and 94 rightward as viewed in FIG. 6, whereby the input piston 14 and the output piston 90 are positioned at their initial positions. When the input piston 14 and the output piston 90 are positioned at their initial positions, the input piston 14 and the output piston 90 are in contact with each other.

When the input piston 14 is positioned at its initial position, the left end as viewed in FIG. 6 of the input piston 14 is positioned on a side toward the first cylinder chamber 18 with respect to the left ends as viewed in FIG. 6 of the cam grooves 36. Also, as mentioned above, a right end portion as viewed in FIG. 7 of each of the cam grooves 96 and a left end portion as viewed in FIG. 7 of each of the cam grooves 36 overlap with each other with respect to axial position. Accordingly, although grooves corresponding to the grooves 16A in the above-described first and third embodiments are not provided, the second chamber 24 between the input piston 14 and the output piston 90 communicates with the cam grooves 36 and 96 via a gap between the input piston 14 and the output piston 90 and is thus filled with oil. Also, when the output piston 90 is positioned at its initial position, the left end as viewed in FIG. 6 of the output piston 90 is positioned on a side toward the first cylinder chamber 18 with respect to the left ends as viewed in FIG. 6 of the cam grooves 96. Accordingly, the third cylinder chamber 106 between the output piston 90 and the end cap 22B communicates with the cam grooves 96 and is thus filled with oil.

Thus, in the illustrated fourth embodiment, the load transmission rod 30, the guide grooves 32, the cam grooves 36, the guide rollers 38, the cam rollers 40, etc. cooperatively function as the first transmission means 54 for converting a rectilinear motion along the axis 12 of the input piston 14 to a rotary motion about the axis 12 and transmitting the rotary motion to the intermediate rotor 86, and, as will be described later, transmitting a reaction torque transmitted to the intermediate rotor 86 to the input piston 14 as a reaction force along the axis 12. Also, the first transmission means 54 gradually increases the ratio of the amount of rotary motion of the intermediate rotor 86 to the amount of rectilinear motion along the axis 12 of the input piston 14 with the amount of rectilinear motion of the input piston 14.

Also, the load transmission rod 94, the guide grooves 32, the cam grooves 96, the guide rollers 98, the cam rollers 100, etc. cooperatively function as the second transmission means 56 for converting a rotary motion of the intermediate rotor 86 to a rectilinear motion along the axis 12 and transmitting the rectilinear motion to the output piston 90; compressively deforming the compression coil spring 92 via the output piston 90; and transmitting a reaction force of the compression coil spring 92 to the intermediate rotor 86 as a reaction torque about the axis 12. Also, the second transmission means 56 gradually increases the ratio of the amount of rectilinear motion along the axis 12 of the output piston 90 to the amount of rotary motion of the intermediate rotor 86 with the amount of rotary motion of the intermediate rotor 86, thereby gradually increasing the ratio of the amount of rectilinear motion along the axis 12 of the output piston 90 to the amount of rectilinear motion along the axis 12 of the input piston 14 with the amount of rectilinear motion of the input piston 14.

Figure 20:
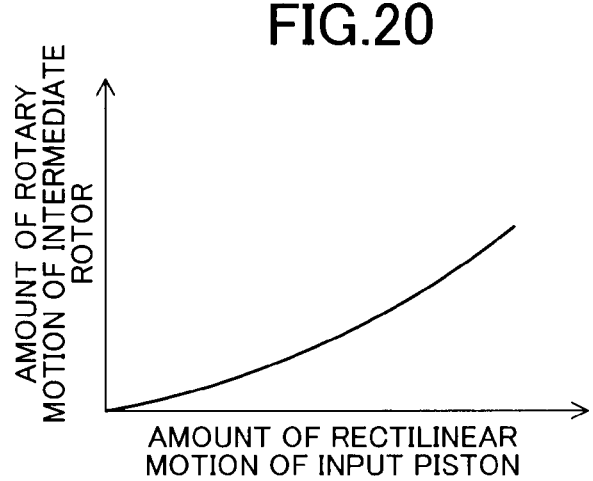
FIG. 20 is a graph showing the relation between the amount of rectilinear motion of the input piston and the amount of rotary motion of the intermediate rotor.
Figure 21:
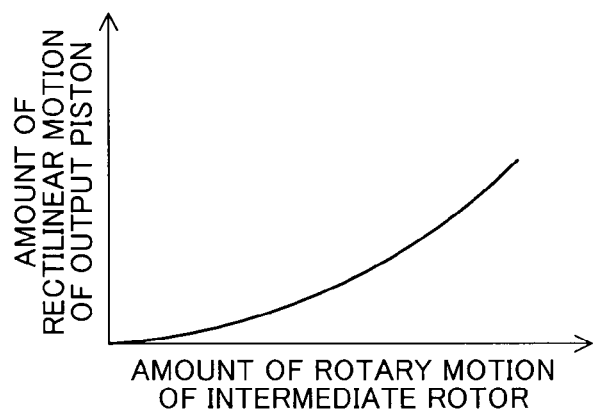
FIG. 21 is a graph showing the relation between the amount of rotary motion of the intermediate rotor and the amount of rectilinear motion of the output piston.

As mentioned above, the degree of curve of the cam grooves 36 and 96 is set smaller than that of the cam grooves 36 in the above-described first embodiment. Thus, as shown in FIG. 20, the rate at which the ratio of the amount of rotary motion of the intermediate rotor 86 to the amount of rectilinear motion of the input piston 14 increases with the amount of rectilinear motion of the input piston 14 is lower than the rate at which the ratio of the amount of rotary motion of the output rotor 34 to the amount of rectilinear motion of the input piston 14 increases with the amount of rectilinear motion of the input piston 14 in the above-described first embodiment. Similarly, as shown in FIG. 21, the rate at which the ratio of the amount of rectilinear motion of the output piston 90 to the amount of rotary motion of the intermediate rotor 86 increases with the amount of rotary motion of the intermediate rotor 86 is lower than the rate at which the ratio of the amount of rotary motion of the output rotor 34 to the amount of rectilinear motion of the input piston 14 increases with the amount of rectilinear motion of the input piston 14 in the above-described first embodiment.

Figure 22:
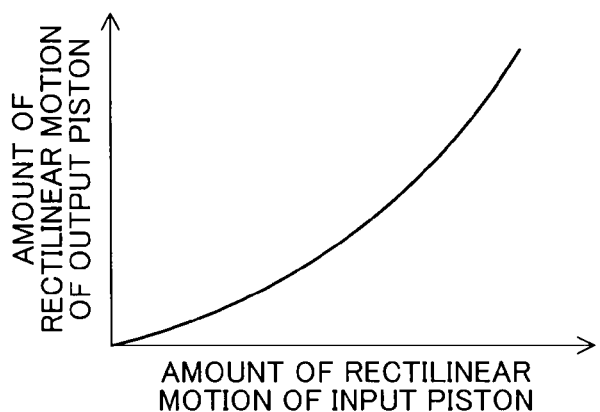
FIG. 22 is a graph showing the relation between the amount of rectilinear motion of the input piston and the amount of rectilinear motion of the output piston.

However, in the fourth embodiment, the ratio of the amount of rectilinear motion of the output piston 90 to the amount of rectilinear motion of the input piston 14 is determined by actions of both of the first transmission means 54 and the second transmission means 56. Accordingly, the ratio of the amount of compressive deformation of the compression coil spring 92 to the amount of rectilinear motion of the input piston 14 is also determined by actions of both of the first transmission means 54 and the second transmission means 56. Thus, as shown in FIG. 22, the characteristic of pedal reaction force vs. the magnitude of treading on the brake pedal 212 is similar to the nonlinear characteristic of the above-described first embodiment shown in FIG. 19.

When the input piston 14 moves rectilinearly leftward as viewed in FIG. 6 along the axis 12, as mentioned above, the output piston 90 also moves rectilinearly leftward as viewed in FIG. 6 along the axis 12. However, the amount of rectilinear motion of the output piston 90 is greater than that of the input piston 14. Accordingly, the volume of the second cylinder chamber 24 increases, whereas the volume of the third cylinder chamber 106 decreases. By contrast, when the input piston 14 moves rectilinearly rightward as viewed in FIG. 6 along the axis 12, the volume of the second cylinder chamber 24 decreases, whereas the volume of the third cylinder chamber 106 increases.

Since the second cylinder chamber 24 communicates with the cam grooves 36 as mention above, when the volume of the second cylinder chamber 24 increases or decreases, oil flows between the second cylinder chamber 24 and the cam grooves 36. Also, since the third cylinder chamber 106 communicates with the cam grooves 96 as mentioned above, when the volume of the third cylinder chamber 106 increases or decreases, oil flows between the third cylinder chamber 106 and the cam grooves 96.

Also, fifth to eighth embodiments to be described later are similar to the present embodiment in the following actions of the first transmission means 54 and the second transmission means 56: conversion of a rectilinear motion of the input piston 14 to a rotary motion of the intermediate rotor 86 and conversion of the rotary motion of the intermediate rotor 86 to a rectilinear motion of the output piston 90; determination of the ratio of the amount of rectilinear motion of the output piston 90 to the amount of rectilinear motion of the input piston 14; and transmission of reaction force of the compression coil spring 92 to the input piston 14 via the output piston 90 and the intermediate rotor 86.

Thus, according to the illustrated fourth embodiment, similar to the above-described first to third embodiments, even in a situation in which communication is shut off between the master cylinder and the wheel cylinders, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, according to the illustrated fourth embodiment, the first transmission means 54 converts a rectilinear motion along the axis 12 of the input piston 14 to a rotary motion about the axis 12 of the intermediate rotor 86, and the second transmission means 56 converts the rotary motion of the intermediate rotor 86 to a rectilinear motion along the axis 12 of the output piston 90, thereby compressively deforming the compression coil spring 92 along the axis 12. Thus, all of component members can be disposed on the basis of the axis 12. This configurational feature also applies to other embodiments to be described later.

Also, according to the fourth embodiment, when the input piston 14 is positioned at its initial position, since the compression coil spring 92 urges the output piston 90 rightward as viewed in FIG. 6, the load transmission rods 30 and 94, etc. are positioned at their rightmost initial positions, and the output piston 90 is in contact with the input piston 14. Thus, at the time of nonbraking, the occurrence of shaky movement of the input piston 14 and the output piston 90 can be effectively prevented.

Fifth Embodiment

Figure 8:
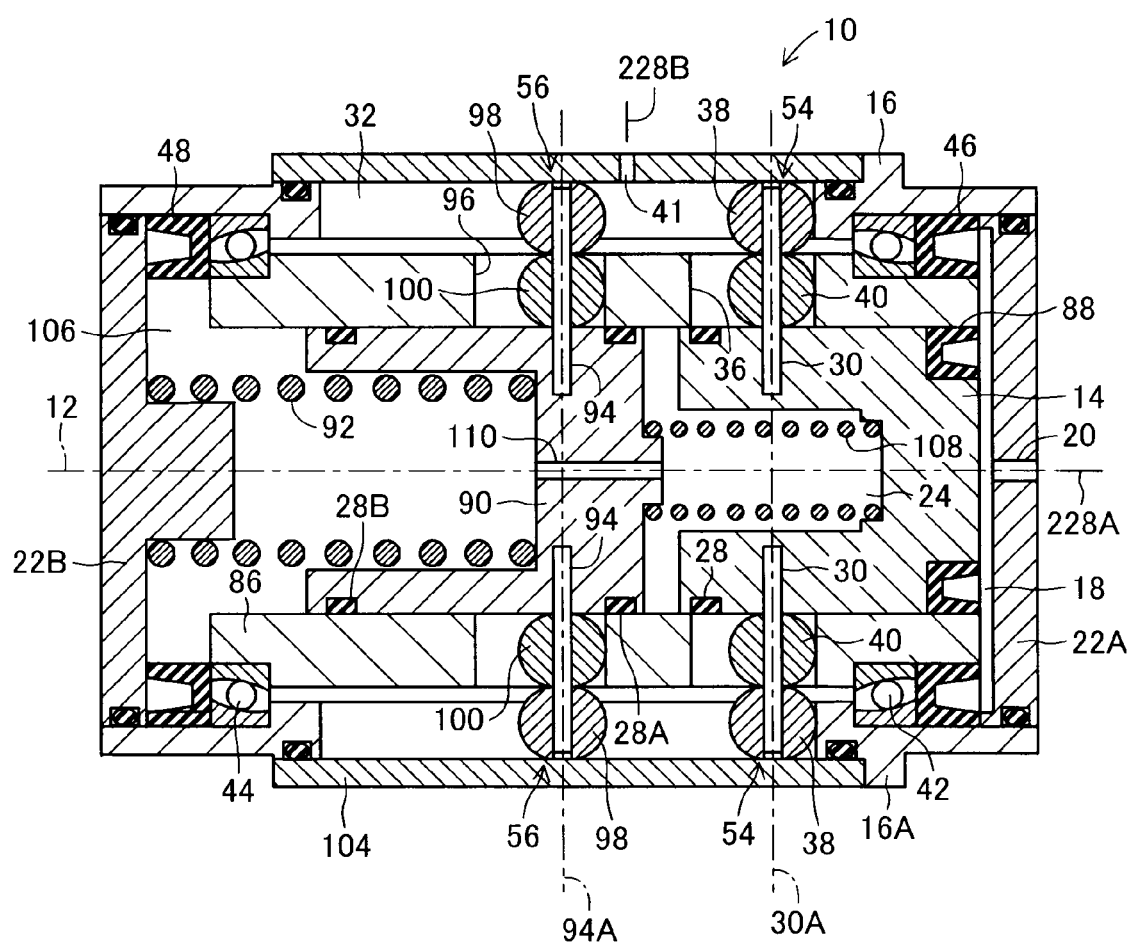
FIG. 8 is an axially-taken sectional view showing a fifth embodiment of the manipulation simulator according to the present invention and configured as a brake stroke simulator.
Figure 9:
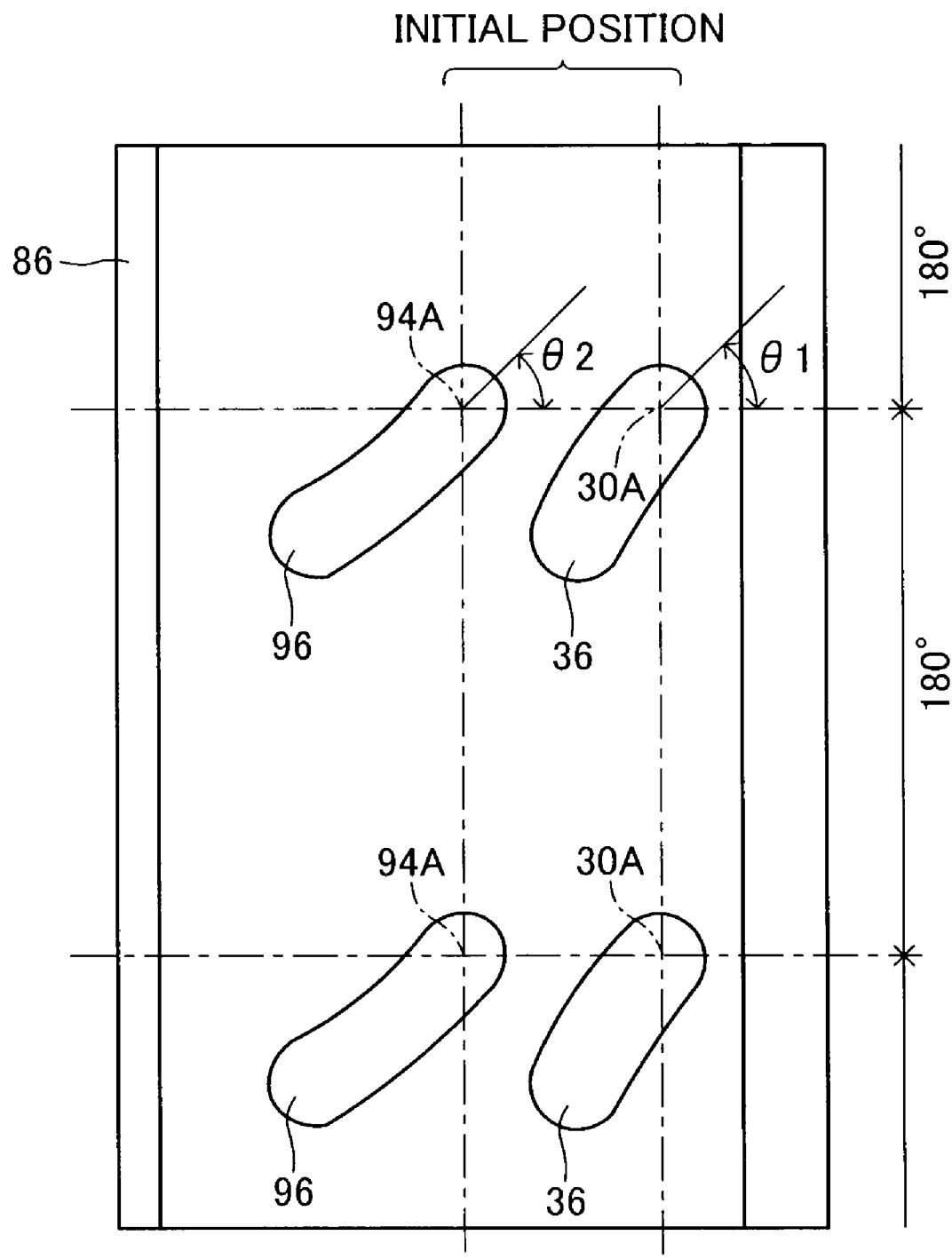
FIG. 9 is a development view in which an intermediate rotor of the fifth embodiment is developed on a plane.

FIG. 8 is an axially-taken sectional view showing a fifth embodiment of the manipulation simulator according to the present invention and configured as a brake stroke simulator. FIG. 9 is a development view in which an intermediate rotor of the fifth embodiment is developed on a plane.

In the fifth embodiment, each of the load transmission rods 30 and 94 is divided into two radially extending pieces. The individual load transmission rods 30 and the individual load transmission rods 94 are supported at their radially inner end portions by the input piston 14 and the output piston 90, respectively, in a cantilever fashion. A tension coil spring 108 extending along the axis 12 is disposed in the second cylinder chamber 24. The tension coil spring 108 is fixed at one end to the input piston 14 and is fixed at the other end to the output piston 90. Thus, the tension coil spring 108 applies such a tensile load to the input piston 14 and the output piston 90 as to draw the input piston 14 and the output piston 90 toward each other.

The axial length of the input piston 14 is set shorter than that in the above-described fourth embodiment. Thus, even when the input piston 14 and the output piston 90 are positioned at respective initial positions, the left end as viewed in FIG. 8 of the input piston 14 is spaced apart from the output piston 90. By contrast, the axial length of the output piston 90 is set longer than that in the above-described fourth embodiment. Thus, even when the output piston 90 is positioned at its initial position, the antifriction ring 28B shuts off the third cylinder chamber 106 from the cam grooves 96.

The output piston 90 has an orifice 110 which extends in alignment with the axis 12. Thus, the third cylinder chamber 106 communicates at all times with the cam grooves 36 via the orifice 110 and the second cylinder chamber 24. The cup seal 48 is disposed between the end cap 22B and the angular bearing 44, thereby preventing flow of oil between the third cylinder chamber 106 and the cam grooves 36 via the angular bearing 44. The cam grooves 36 and the cam grooves 96 are spaced apart from each other along the axis 12 by a distance longer than that in the above-described fourth embodiment. Thus, a right end portion as viewed in FIG. 9 of each of the cam grooves 96 and a left end portion as viewed in FIG. 9 of each of the cam grooves 36 do not overlap with each other with respect to axial position. However, the cam grooves 36 and the cam grooves 96 may overlap with each other as in the case of the above-described fourth embodiment. Other configurational features of the fifth embodiment are similar to those of the above-described fourth embodiment.

In the fifth embodiment, the first transmission means 54 and the second transmission means 56 function similar to the case of the above-described fourth embodiment. Thus, when the input piston 14 moves rectilinearly leftward as viewed in FIG. 8 along the axis 12, the output piston 90 also moves rectilinearly leftward as viewed in FIG. 8 along the axis 12. However, the amount of rectilinear motion of the output piston 90 is greater than that of the input piston 14. Accordingly, the distance between the input piston 14 and the output piston 90 gradually increases, whereas the distance between the output piston 90 and the end cap 22B gradually decreases.

Accordingly, when the input piston 14 moves rectilinearly leftward as viewed in FIG. 8 along the axis 12, the output piston 90, which serves as an output member, compressively deforms the compression coil spring 92 and tensilely deforms the tension coil spring 108. Thus, the output piston 90 is subjected to a reaction force associated with compressive deformation of the compression coil spring 92 and a reaction force associated with tensile deformation of the tension coil spring 108. These reaction forces increase nonlinearly such that, as the amount of leftward rectilinear motion as viewed in FIG. 8 of the input piston 14 increases, the rate of increase gradually increases.

By contrast, when the input piston 14 moves rectilinearly rightward as viewed in FIG. 8 along the axis 12, the distance between the input piston 14 and the output piston 90 decreases, whereas the distance between the output piston 90 and the end cap 22B increases. Accordingly, when the input piston 14 moves rectilinearly rightward as viewed in FIG. 8 along the axis 12, the output piston 90 reduces the amount of compressive deformation of the compression coil spring 92 and the amount of tensile deformation of the tension coil spring 108. A reaction force associated with compressive deformation of the compression coil spring 92 and the tensile deformation of the tension coil spring 108 which act on the output piston 90 decrease nonlinearly such that, as the amount of rightward rectilinear motion as viewed in FIG. 8 of the input piston 14 increases, the rate of decrease gradually decreases.

A spring force associated with tensile deformation of the tension coil spring 108 acts on the input piston 14 in such a manner as to reduce the reaction force against the force with witch the input piston 14 is moved rectilinearly; however, a spring force associated with tensile deformation of the tension coil spring 108 acts on the output piston 90 in such a manner as to increase the reaction force. Since these spring forces are of opposite directions and have the same magnitude, the spring force of the tension coil spring 108 does not cause increase and decrease of the reaction force.

Thus, according to the illustrated fifth embodiment, similar to the above-described first to fourth embodiments, even in a situation in which communication is shut off between the master cylinder and the wheel cylinders, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, according to the illustrated fifth embodiment, the output piston 90 has the orifice 110 for establishing communication between the second cylinder chamber 24 and the third cylinder chamber 106. The higher the treading speed of the brake pedal 212, the higher the flow resistance associated with passage of oil through the orifice 110. Since the flow resistance has the effect of increasing a reaction force, the higher the treading speed of the brake pedal 212, the greater an operational reaction force.

Also, according to the illustrated fifth embodiment, the tension coil spring 108 is elastically attached between the input piston 14 and the output piston 90, so that shaky movements of the input piston 14, the output piston 90, etc. can be effectively restrained. Since the input piston 14 and the output piston 90 are spaced apart from each other even at their initial positions, in the course of return of the input piston 14 and the output piston 90 to their initial positions, their mutual strike can be reliably prevented.

Sixth Embodiment

Figure 10:
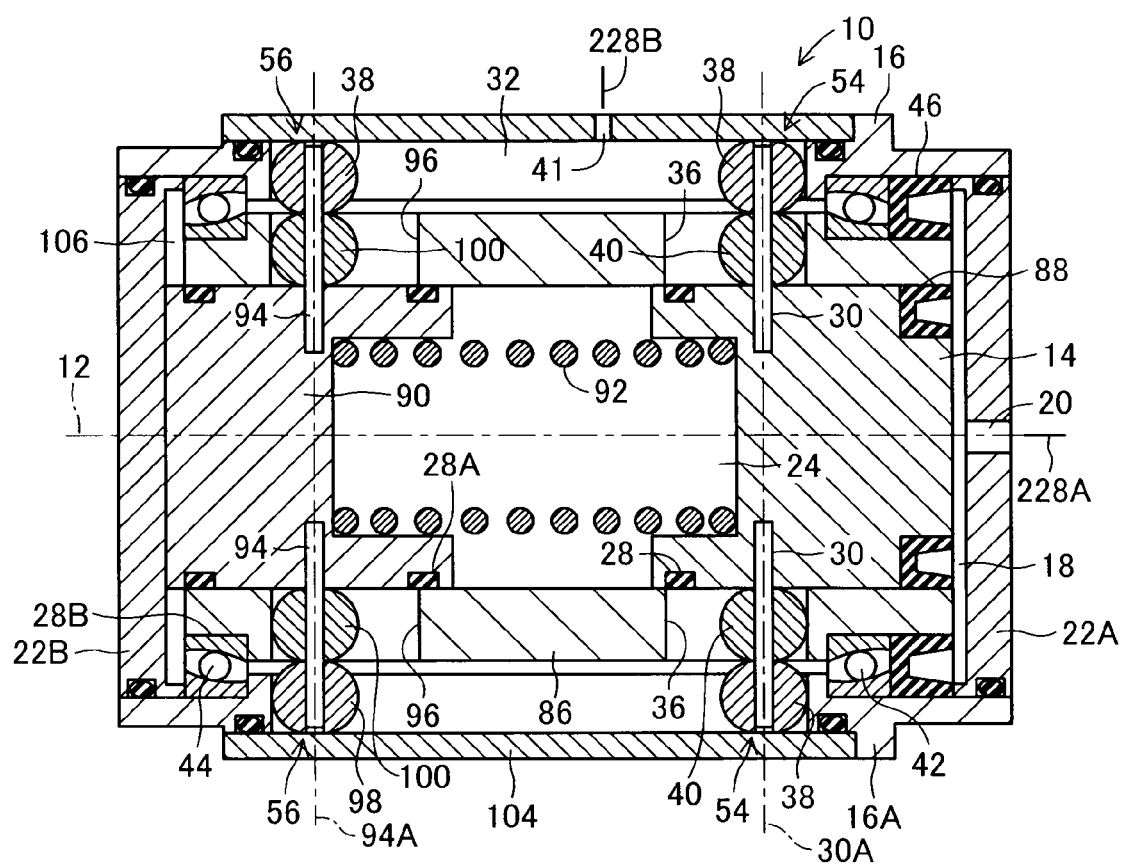
FIG. 10 is an axially-taken sectional view showing a sixth embodiment of the manipulation simulator according to the present invention and configured as a brake stroke simulator.
Figure 11:
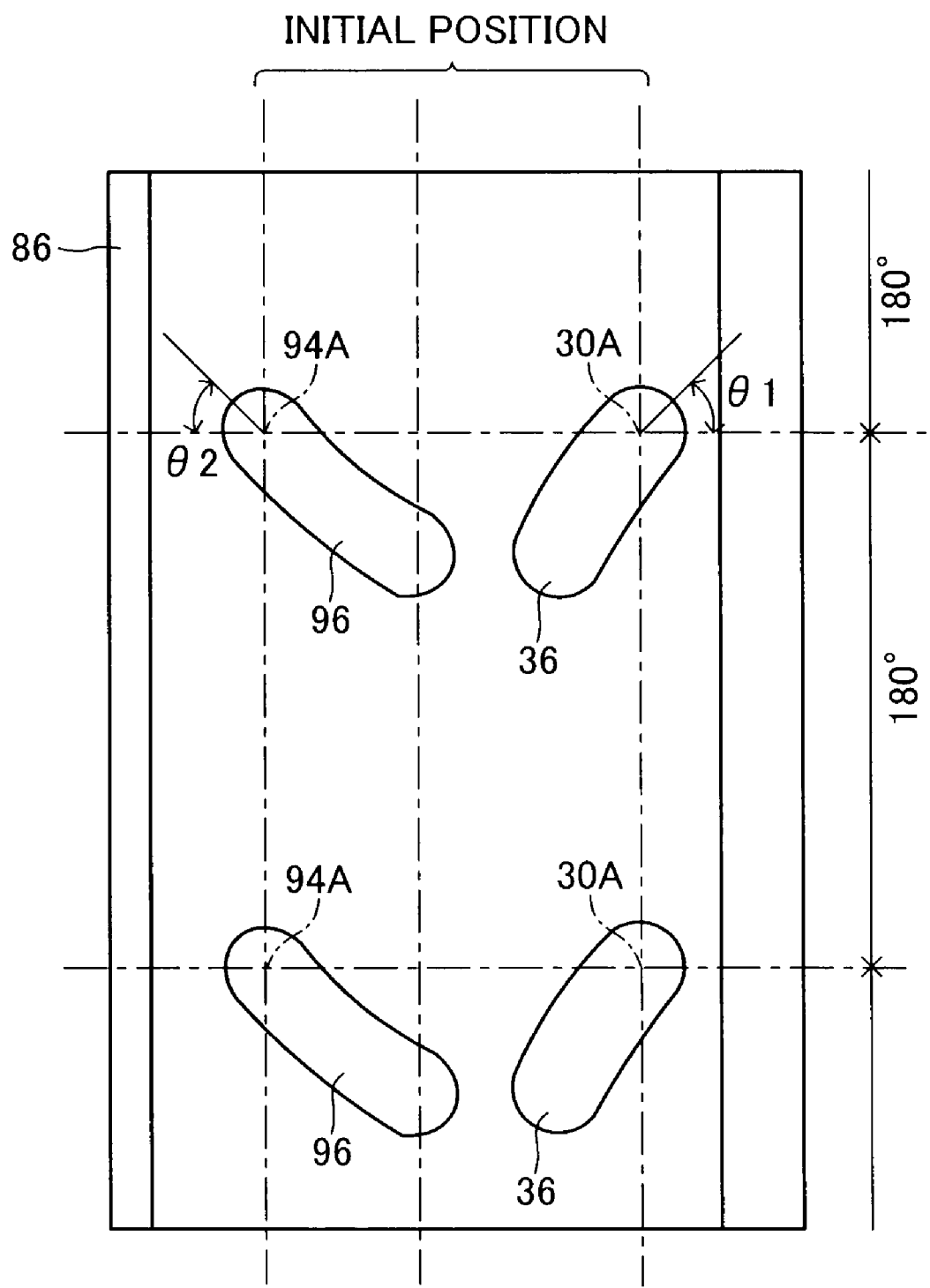
FIG. 11 is a development view in which an intermediate rotor of the sixth embodiment is developed on a plane.

FIG. 10 is an axially-taken sectional view showing a sixth embodiment of the manipulation simulator according to the present invention and configured as a brake stroke simulator. FIG. 11 is a development view in which an intermediate rotor (intermediate member) of the sixth embodiment is developed on a plane.

In the sixth embodiment, similar to the above-described fifth embodiment, each of the load transmission rods 30 and 94 is divided into two radially extending pieces. The individual load transmission rods 30 and the individual load transmission rods 94 are supported at their radially inner end portions by the input piston 14 and the output piston 90, respectively, in a cantilever fashion. The input piston 14 has a cup-like sectional shape which opens toward the end cap 22B, whereas the output piston 90 has a cup-like sectional shape which opens toward the input piston 14. The compression coil spring 92, which serves as reaction force generation means, is disposed in the second cylinder chamber 24 and is elastically attached between the input piston 14 and the output piston 90. Notably, the load transmission rods 30 and 94 may each assume the form of a single rod which diametrally extends through each of the input piston 14 and the output piston 90.

As shown in FIG. 11, the cam grooves 96 are provided in the intermediate rotor 86 in such a manner as to be inclined, with respect to the axis 12 and the circumferential direction, in a direction opposite the direction of the cam grooves 96 in the above-described fourth and fifth embodiments. Accordingly, at the time of nonbraking, the guide rollers 38 and the cam rollers 40, which partially constitute the first transmission means 54, are positioned at their initial positions where the guide rollers 38 and the cam rollers 40 are in contact with right ends as viewed in FIG. 10 of the guide grooves 32 and the cam grooves 36, respectively, whereas the guide rollers 98 and the cam rollers 100, which partially constitute the second transmission means 56, are positioned at their initial positions where the guide rollers 98 and the cam rollers 100 are in contact with left ends as viewed in FIG. 10 of the guide grooves 32 and the cam grooves 96, respectively. When the guide rollers 38 and the cam rollers 40 are positioned at their initial positions, the input piston 14 is positioned closest to the end cap 22A. When the guide roller 98 and the cam rollers 100 are positioned at their initial positions, the output piston 90 is in contact with the end cap 22B. Thus, the volumes of the first cylinder chamber 18 and the third cylinder chamber 106 become minimum, and the volume of the second cylinder chamber 24 becomes maximum.

Other configurational features of the sixth embodiment are similar to those of the above-described fourth embodiment. Accordingly, the first transmission means 54 functions similar to that of the fourth embodiment. The second transmission means 56 functions similar to that of the fourth embodiment except that the relation between the direction of rotary motion of the intermediate rotor 86 and the direction of rectilinear motion of the output piston 90 is in reverse.

Thus, when the input piston 14 moves rectilinearly leftward as viewed in FIG. 10 along the axis 12, the output piston 90 moves rectilinearly rightward as viewed in FIG. 10 along the axis 12, whereby the input piston 14 and the output piston 90 compressively deform the compression coil spring 92 in cooperation with each other. In this case, the rate of decrease of distance between the input piston 14 and the output piston 90 increases with the amount of leftward rectilinear motion as viewed in FIG. 10 of the input piston 14. Accordingly, a reaction force of the compression coil spring 92 imposed on the input piston 14 nonlinearly increases such that the rate of increase gradually increases with the amount of leftward rectilinear motion as viewed in FIG. 10 of the input piston 14.

By contrast, when the input piston 14 rectilinearly moves rightward as viewed in FIG. 10 along the axis 12, the distance between the input piston 14 and the output piston 90 increases, and the amount of compressive deformation of the compression coil spring 92 decreases. Thus, a reaction force of the compression coil spring 92 imposed on the input piston 14 decreases nonlinearly such that, as the amount of rightward rectilinear motion as viewed in FIG. 10 of the input piston 14 increases, the rate of decrease gradually decreases.

Thus, according to the illustrated sixth embodiment, similar to the above-described first to fifth embodiments, even in a situation in which communication is shut off between the master cylinder and the wheel cylinders, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, according to the illustrated sixth embodiment, a reaction force associated with compressive deformation of the compression coil spring 92 is not only transmitted to the input piston 14 via the intermediate rotor 86, etc., but also directly imposed on the input piston 14. Thus, as compared with the fourth and fifth embodiments described above and seventh and eighth embodiments to be described later, a load imposed on the load transmission rods 30 and 94, etc. is lowered, whereby the durability of the brake stroke simulator 10 can be improved.

According to the fourth to sixth embodiments described above, the first transmission means 54 and the second transmission means 56 are spaced apart from each other along the axis 12 at the same circumferential position about the axis 12. Thus, the load transmission rods 30 and 94 are positioned at the same circumferential position about the axis 12. The guide grooves 32 are common to the first transmission means 54 and the second transmission means 56. Thus, as compared with the seventh and eighth embodiments in which guide grooves are provided for each of the first transmission means 54 and the second transmission means 56, the number of steps of machining the guide grooves 32 can be reduced.

Seventh Embodiment

Figure 12:
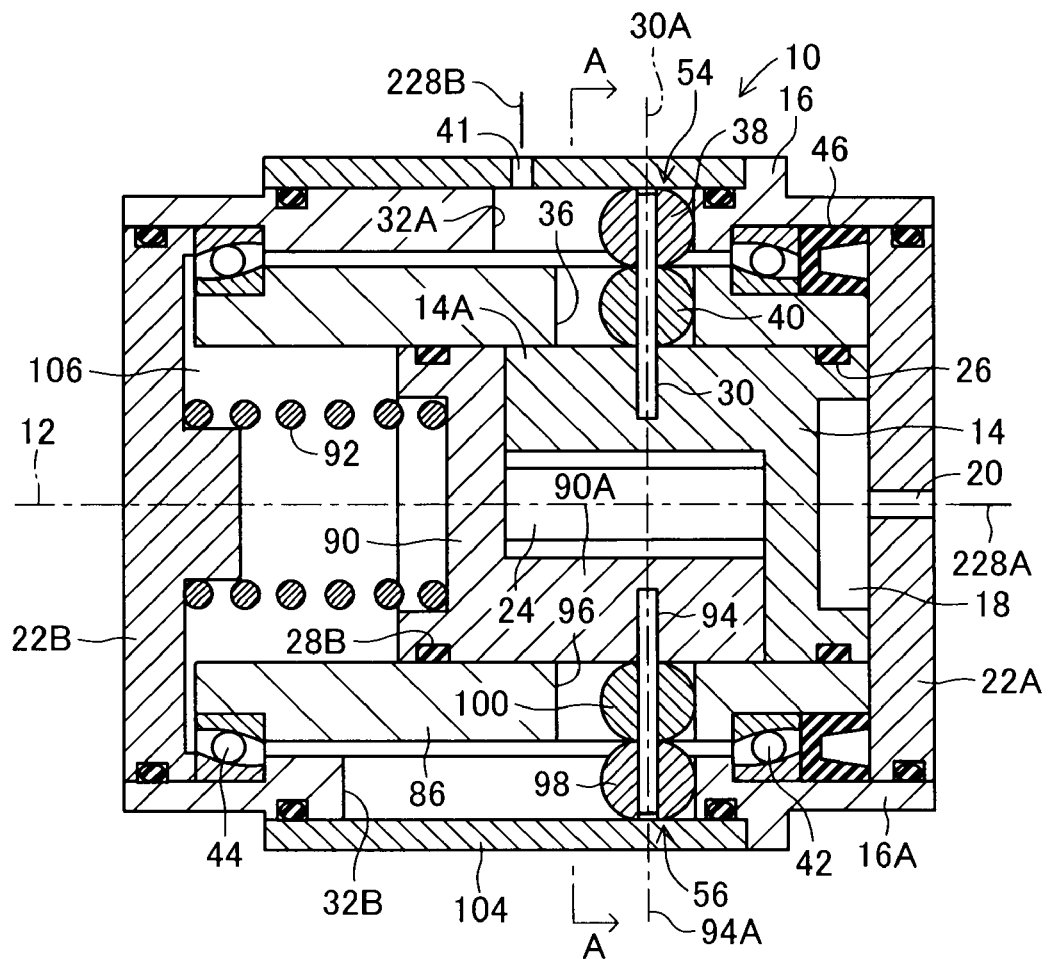
FIG. 12 is a sectional view cut along two cutting planes which cross at right angles on the axis, showing a seventh embodiment of the manipulation simulator according to the present invention and configured as a brake stroke simulator.
Figure 13:
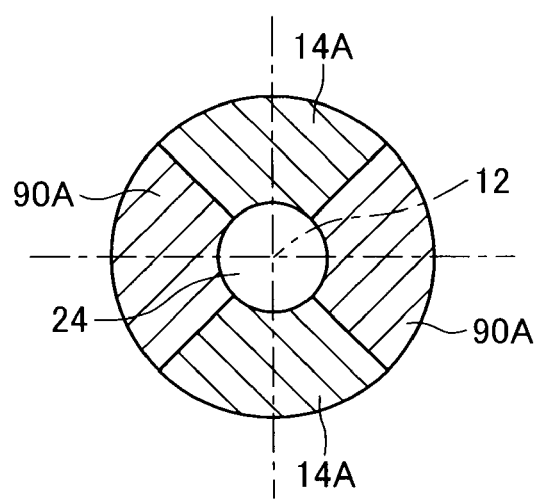
FIG. 13 is a cross-sectional view of an input piston and an output piston taken along line A-A of FIG. 12.
Figure 14:
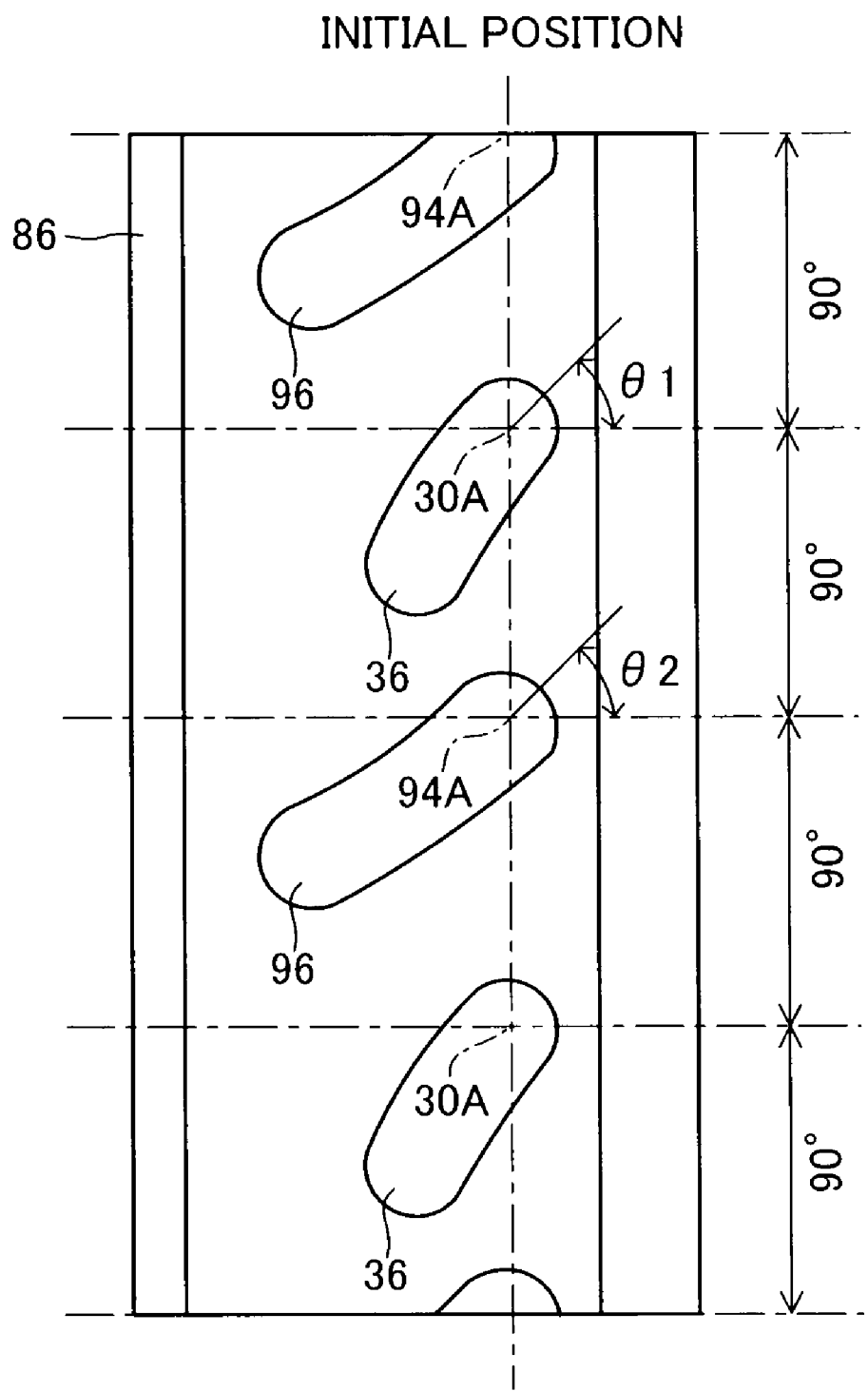
FIG. 14 is a development view in which an intermediate rotor of the seventh embodiment is developed on a plane.

FIG. 12 is a sectional view cut along two cutting planes which cross at right angles on an axis, showing a seventh embodiment of the manipulation simulator according to the present invention and configured as a brake stroke simulator. FIG. 13 is a cross-sectional view of an input piston and an output piston taken along line A-A of FIG. 12. FIG. 14 is a development view in which an intermediate rotor of the seventh embodiment is developed on a plane.

In the seventh embodiment, the input piston 14 has a substantially columnar body portion fitted into the intermediate rotor 86, and a pair of arm portions 14A projecting from the body portion toward the output piston 90 along the axis 12. The paired arm portions 14A are spaced apart from each other in such a manner as to be located on diametrally opposite sides of the axis 12. Similarly, the output piston 90 has a substantially columnar body portion fitted into the intermediate rotor 86, and a pair of arm portions 90A projecting from the body portion toward the input piston 14 along the axis 12. The paired arm portions 90A are spaced apart from each other in such a manner as to be located on diametrally opposite sides of the axis 12. The section of each of the arm portions 14A and 90A taken perpendicularly to the axis 12 has a fanwise shape which has an outer arc line and an inner arc line and whose central angle is substantially 90°. Particularly, in the illustrated embodiment, the input piston 14 and the output piston 90 are the same members disposed in reverse.

Each of the arm portions 14A is positioned between the arm portions 90A with respect to the circumferential direction about the axis 12. Thus, the input piston 14 and the output piston 90 are engaged with each other in such a manner as to be rectilinearly movable along the axis 12 in relation to each other and to be nonrotatable about the axis 12 in relation to each other. Similar to the above-described fourth embodiment, the compression coil spring 92, which serves as reaction force generation means, is elastically attached between the output piston 90 and the end cap 22B. When the input piston 14 and the output piston 90 are positioned at their initial positions, ends of the arm portions 14A and ends of the arm portions 90A are in contact with the body portion of the output piston 90 and the body portion of the input piston 14, respectively, in a mutually pressing condition.

Similar to the above-described fifth and sixth embodiments, each of the load transmission rods 30 and 94 is divided into two radially extending pieces. The individual load transmission rods 30 and the individual load transmission rods 94 are supported at their radially inner end portions by the arm portions 14A of the input piston 14 and the arm portions 90A of the output piston 90, respectively, in a cantilever fashion. Particularly, in the illustrated embodiment, the load transmission rods 30 and 94 are positioned at the same axial position along the axis 12. Thus, these load transmission rods are alternately arranged in the circumferential direction about the axis 12 along a plane perpendicular to the axis 12 while being spaced 90° apart from one another. Notably, the load transmission rods 30 and the load transmission rods 94 may be located at mutually different axial positions.

As shown in FIG. 14, the cam grooves 36 and 96 assume the same form as the cam grooves 36 and 96 in the above-described fourth and fifth embodiments; however, the cam grooves 36 and 96 are arranged alternately in the circumferential direction. Particularly, in the illustrated embodiment, right end portions of the cam grooves 36 and 96 are positioned at the same axial position, and the range in which the cam grooves 36 extend along the axis 12 overlaps the range in which the cam grooves 96 extend along the axis 12.

Also, the guide rollers 38 and 98 are engaged with the guide grooves 32A and 32B, respectively, provided in the body 16A of the housing 16. The guide grooves 32A and 32B extend rectilinearly along the axis 12 and are alternately arranged in the circumferential direction about the axis 12 while being spaced 90° apart from one another. As shown in FIG. 12, the guide grooves 32B are set longer than the guide grooves 32A. Other configurational features of the seventh embodiment are similar to those of the above-described fourth embodiment.

In the seventh embodiment, the first transmission means 54 and the second transmission means 56 function similar to those in the above-described fourth embodiment. Specifically, a rectilinear motion along the axis 12 of the input piston 14 is converted to a rotary motion about the axis 12; the rotary motion is transmitted to the intermediate rotor 86; the rotary motion of the intermediate rotor 86 is converted to a rectilinear motion along the axis 12; and the rectilinear motion is transmitted to the output piston 90. A reaction force which is generated along the axis 12 through compressive deformation of the compression coil spring 92 caused by the output piston 90 is converted to a reaction torque by the output piston 90; the reaction torque is transmitted to the intermediate rotor 86; the reaction torque of the intermediate rotor 86 is converted to a reaction force along the axis 12; and the reaction force is transmitted to the input piston 14. Similar to the above-described embodiments, the ratio of the amount of rectilinear motion of the output piston 90 to the amount of rectilinear motion of the input piston 14 exhibits a nonlinear characteristic.

Thus, according to the illustrated seventh embodiment, similar to the above-described first to sixth embodiments, even in a situation in which communication is shut off between the master cylinder and the wheel cylinders, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, according to the illustrated seventh embodiment, the arm portions 14A of the input piston 14 and the arm portions 90A of the output piston 90 are engaged with each other in such a manner as to be rectilinearly movable along the axis 12 in relation to each other and to be nonrotatable about the axis 12 in relation to each other. Thus, the arm portions 14A and 90A also guide a relative motion along the axis 12 between the input piston 14 and the output piston 90 and prevent a relative rotation about the axis 12 between the input piston 14 and the output piston 90. Therefore, as compared with the above-described fourth and fifth embodiments, a relative rectilinear motion between the input piston 14 and the output piston 90 can be smoothly performed.

Also, according to the illustrated seventh embodiment, the input piston 14 and the output piston 90 are the same members disposed in an oppositely oriented relation. Thus, as compared with other embodiments in which the input piston 14 and the output piston 90 differ from each other, the number of types of components can be reduced, so that the cost of the stroke simulator 10 can be reduced.

Eighth Embodiment

Figure 15:
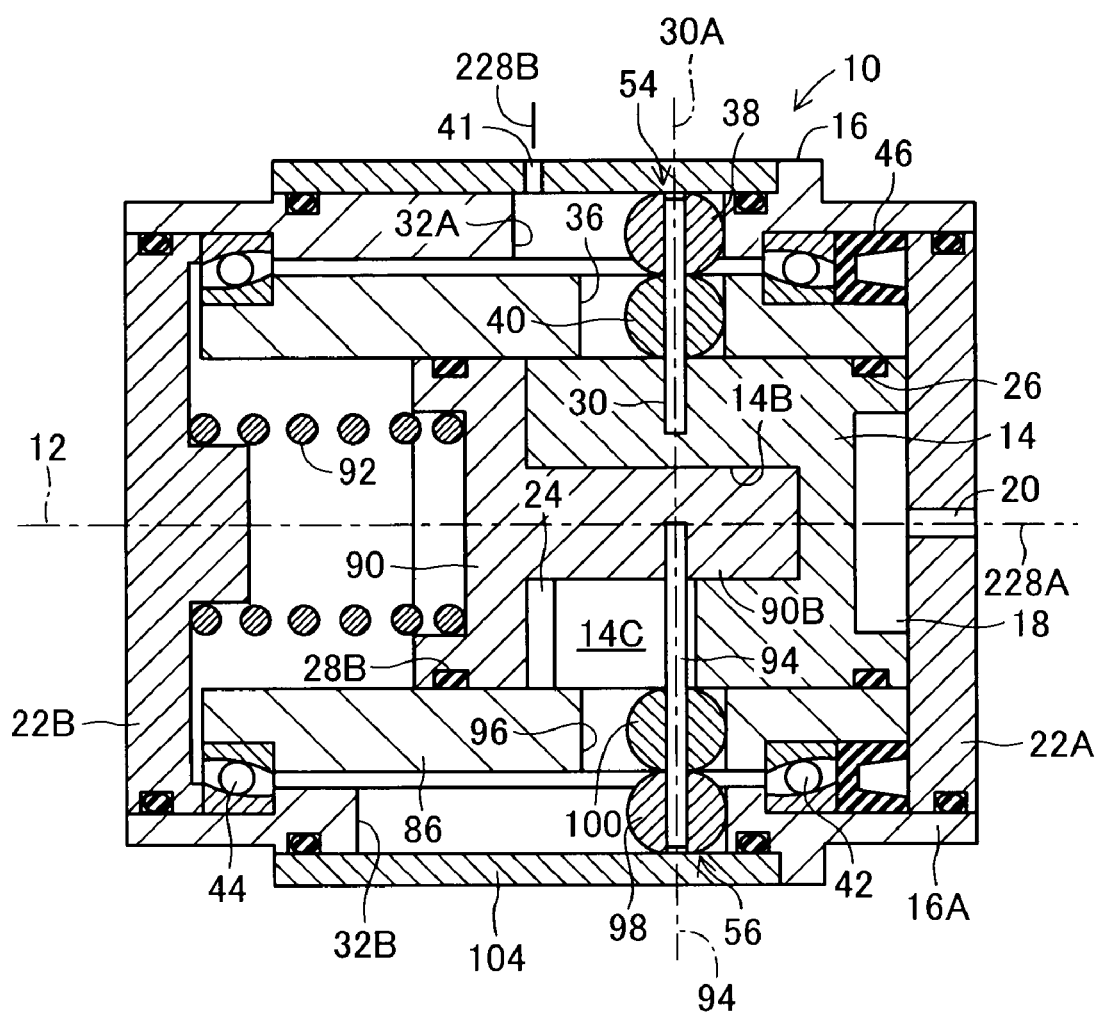
FIG. 15 is an axially-taken sectional view showing an eighth embodiment of the manipulation simulator according to the present invention and configured as a brake stroke simulator.
Figure 16:
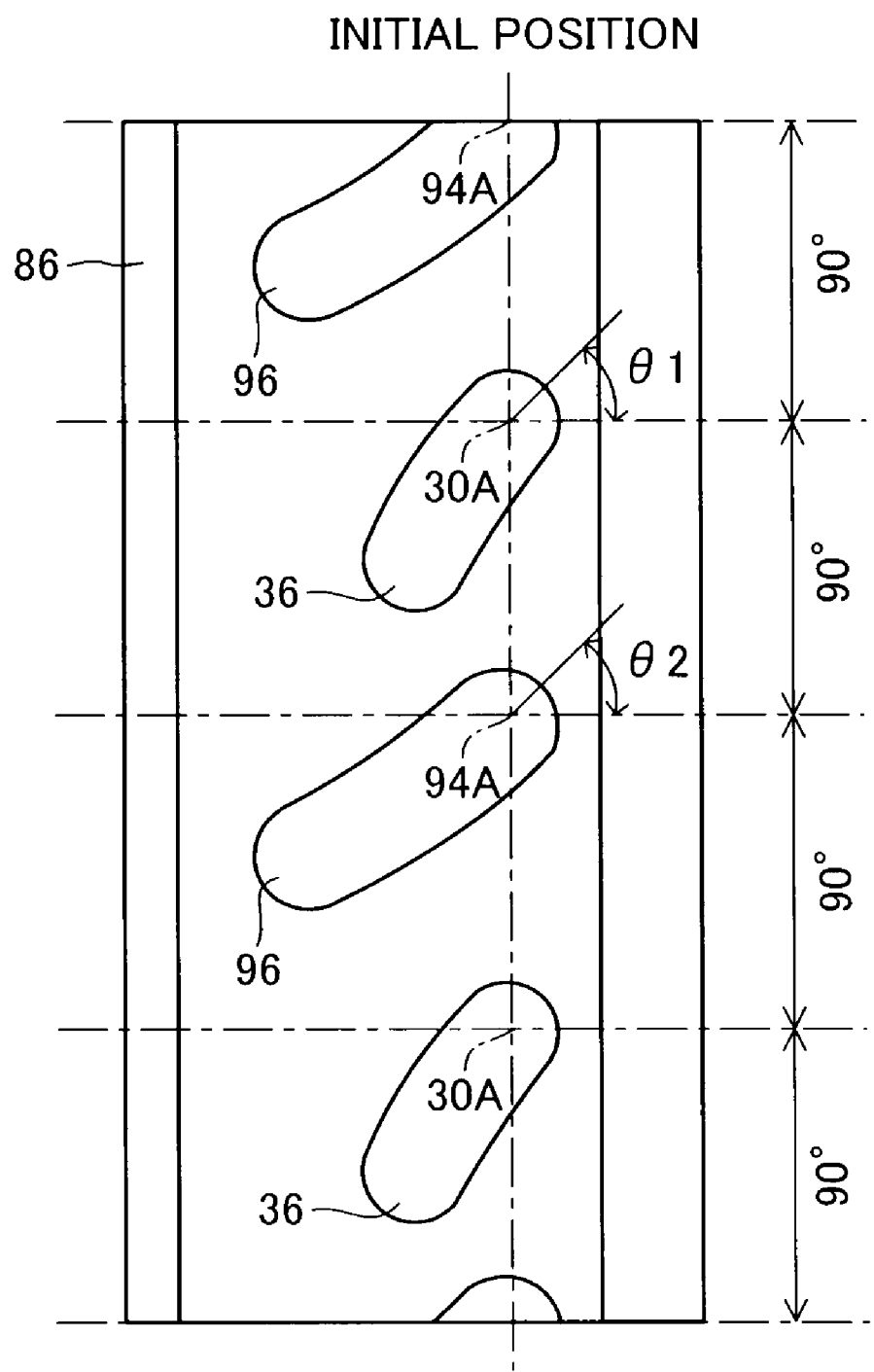
FIG. 16 is a development view in which an intermediate rotor of the eighth embodiment is developed on a plane.

FIG. 15 is an axially-taken sectional view showing an eighth embodiment of the manipulation simulator according to the present invention and configured as a brake stroke simulator. FIG. 16 is a development view in which an intermediate rotor of the eighth embodiment is developed on a plane.

In the eighth embodiment, the input piston 14 is a substantially columnar member fitted into the intermediate rotor 86 and has a cylindrical recess 14B which extends in alignment with the axis 12 and opens toward the output piston 90. By contrast, the output piston 90 has a substantially columnar body portion fitted into the intermediate rotor 86, and a shaft portion 90B which has a circular cross section and projects from the body portion toward the input piston 14 while being aligned on the axis 12. The shaft portion 90B is inserted into the recess 14B in such a manner as to be displaceable along the axis 12 in relation to the recess 14B. The compression coil spring 92, which serves as reaction force generation means, is elastically attached between the output piston 90 and the end cap 22B. When the input piston 14 and the output piston 90 are positioned at their initial positions, the input piston 14 and the output piston 90 are in contact with each other in a mutually pressing condition.

Similar to the above-described fifth to seventh embodiments, each of the load transmission rods 30 and 94 is divided into two radially extending pieces. The individual load transmission rods 30 are supported in a cantilever fashion at their radially inner end portions by a portion of the input piston 14 around the recess 14B, whereas the individual load transmission rods 94 are supported in a cantilever fashion by the shaft portion 90B of the output piston 90. Similar to the above-described seventh embodiment, the load transmission rods 30 and 94 are positioned at the same axial position. Thus, these load transmission rods are alternately arranged in the circumferential direction about the axis 12 along a plane perpendicular to the axis 12 while being spaced 90° apart from one another.

Also, the input piston 14 has two slits 14C which are spaced 90° apart from the load transmission rods 30 about the axis 12 and which open toward the output piston 90. The load transmission rods 94 pass through the respective slits 14C in such a loose condition as to be rectilinearly movable along the axis 12 in relation to the input piston 14. Other configurational features of the eighth embodiment are similar to those of the above-described seventh embodiment.

Notably, also in the present embodiment, the load transmission rods 30 and the load transmission rods 94 may be located at mutually different axial positions. Furthermore, the paired load transmission rods 94 may assume the form of a single rod which extends diametrally through each of the shaft portion 90B of the output shaft 90 and the paired slits 14C of the input piston 14.

Even in the eighth embodiment, the first transmission means 54 and the second transmission means 56 function similar to those of the above-described fourth embodiment. Thus, the conversion and transmission of motion and the transmission of reaction force of the compression coil spring 92 among the input piston 14, the intermediate rotor 86, and the output piston 90 can be achieved similar to the above-described fourth embodiment. Also, the ratio of the amount of rectilinear motion of the output piston 90 to the amount of rectilinear motion of the input piston 14 exhibits a nonlinear characteristic as in the case of the above-described other embodiments.

Thus, according to the illustrated eighth embodiment, similar to the above-described first to seventh embodiments, even in a situation in which communication is shut off between the master cylinder and the wheel cylinders, the stroke simulator 10 allows the driver to effect a tread stroke of the brake pedal 212 and increases continuously and nonlinearly a brake reaction force which the driver feels from the brake pedal 212, with the magnitude of treading on the brake pedal 212. Thus, the stroke simulator 10 can provide an optimum brake operation feeling.

Particularly, according to the illustrated eighth embodiment, the shaft portion 90B of the output piston 90 is inserted into the recess 14B of the input piston 14, whereby the shaft portion 90B and the recess 14B also guide relative motions of the input piston 14 and the output piston 90 along the axis 12. Thus, as compared with the above-described fourth and fifth embodiments, relative rectilinear motions of the input piston 14 and the output piston 90 can be carried out smoothly.

According to the illustrated seventh and eighth embodiments, the first transmission means 54 and the second transmission means 56 are provided at the same axial position along the axis 12 while being spaced apart from each other about the axis 12. Thus, as compared with the above-described fourth to sixth embodiments in which the first transmission means 54 and the second transmission means 56 are separated from each other along the axis 12, there can be lowered a prying force which acts on the intermediate rotor 86 in association with motion conversion conducted by the first transmission means 54 and the second transmission means 56, whereby the stroke simulator 10 can operate smoothly, and the durability of the stroke simulator 10 can be improved. Also, the length of the stroke simulator 10 along the axis 12 can be reduced, whereby the mountability of the stroke simulator 10 in a vehicle can be improved.

According to the above-described fourth to eighth embodiments, the first transmission means 54 and the second transmission means 56 are provided; the first transmission means 54 gradually increases the ratio of the amount of rotary motion of the intermediate rotor 86 to the amount of rectilinear motion along the axis 12 of the input piston 14 with the amount of rectilinear motion of the input piston 14; and the second transmission means 56 gradually increases the ratio of rectilinear motion along the axis 12 of the output piston 90 to the amount of rotary motion of the intermediate rotor 86 with the amount of rotary motion of the intermediate rotor 86. Thus, as compared with a structure in which only one of the first transmission means 54 and the second transmission means 56 gradually increases the ratio of the amount of motion of a motion transmission destination member to the amount of motion of a motion transmission source member with the amount of motion of the motion transmission source member, the degree of curve of the cam grooves can be reduced, whereby the first transmission means 54 and the second transmission means 56 can smoothly conduct motion conversion and transmission of reaction force.

Also, according to the above-described fourth to eight embodiments, the intermediate rotor 86 is supported by the housing 16 in such a manner as to be rotatable within the housing 16; the input piston 14 and the output piston 90 are supported by the intermediate rotor 86 in a rectilinearly movable manner; and movable members and a reaction generation member are not exposed to the outside of the housing 16. Thus, as compared with the above-described first embodiment in which the output rotor 34, which is a movable member, and the torsion spring 52, which is a reaction force generation member, are exposed to the outside of the housing 16, good mountability in a vehicle or the like can be ensured, and the risk of operational trouble, which could otherwise result from entry of foreign matter into interface between the movable member and the housing, can be lowered.

Also, according to the above-described first embodiment, the guide grooves 32 are provided for guiding the load transmission rod 30 of the transmission means 54 along the axis 12. According to the fourth to eighth embodiments, the guide grooves 32 or 32A, 32B are provided for guiding the load transmission rods 30 of the first transmission means 54 along the axis 12, and the guide grooves 32 or 32B are provided for guiding the load transmission rod 90 of the second transmission means 56 along the axis 12. Thus, as compared with a structure in which the guide grooves are not provided, rotation of the input piston 14 and the output piston 90 about the axis 12 can be reliably prevented. Therefore, a required nonlinear characteristic can be reliably and accurately imparted to the ratio of reaction force to the amount of rectilinear motion of the input piston 14.

Also, according to the above-described first, second, and fourth to eighth embodiments, a plurality of movable members and the reaction generation member are disposed in such a manner as to be aligned on the axis 12, and move along or about the axis 12. Thus, as compared with a structure in which the plurality of movable members and the reaction generation member are disposed in such a manner as to be aligned on different individual axes, the structure of the stroke simulator 10 can be simplified, and motion conversion and transmission of reaction force can be optimally conducted.

While the present invention has been described in detail with reference to the above particular embodiments, it will be apparent to those skilled in the art that the present invention is not limited thereto, but may be embodied in various other forms without departing from the scope of the invention.

For example, in the above-described first embodiment, the output rotor 34 is rotatably supported by the housing 16 at the outside of the housing 16. However, the output rotor 34 may be rotatably supported by the housing 16 at the inside of the housing 16, and the torsion spring 52 may be accommodated within the housing 16.

In the above-described second embodiment, the load transmission member 62 is moved along the axis 12 in a direction opposite the moving direction of the input piston 14, thereby compressively deforming the compression coil spring 64 along the axis 12. However, the moving direction of the load transmission member 62 and the direction of deformation of the reaction force generation means may be set to the same direction as the moving direction of the input piston 14 or may be set to an arbitrary direction, such as a direction which intersects the axis 12.

In the above-described fourth to sixth embodiments, the first transmission means 54 and the second transmission means 56 are positioned at the same circumferential position about the axis 12 and are spaced apart from each other along the axis 12. Thus, the guide grooves 32 are common to the first transmission means 54 and the second transmission means 56. However, the first transmission means 54 and the second transmission means 56 may be provided at different circumferential positions about the axis 12.

In the above-described fourth to eighth embodiments, the first transmission means 54 gradually increases the ratio of the amount of rotary motion of the intermediate rotor 86 to the amount of rectilinear motion along the axis 12 of the input piston 14 with the amount of rectilinear motion of the input piston 14, and the second transmission means 56 gradually increases the ratio of rectilinear motion along the axis 12 of the output piston 90 to the amount of rotary motion of the intermediate rotor 86 with the amount of rotary motion of the intermediate rotor 86. However, this may be modified as follows: only one of the first transmission means 54 and the second transmission means 56 gradually increases the ratio of the amount of motion of a motion transmission destination member to the amount of motion of a motion transmission source member with the amount of motion of the motion transmission source member.

In the above-described sixth embodiment, the input piston 14 and the output piston 90 are spaced apart from each other along the axis 12 at all times. However, the input piston 14 and the output piston 90 may have those portions which are located radially inside or outside of the compression coil spring 92 and are engaged with each other in such a manner as to be rectilinearly movable along the axis 12 in relation to each other as in the above-described seventh and eighth embodiments.

In the above-described seventh embodiment, the input piston 14 and the output piston 90 has the paired arm portions 14A and the paired arm portions 90A, respectively, each of the arm portions 14A and 90A having a fanwise cross section. However, each of the arm portions 14A and 90A may have an arbitrary cross section, such as a semicircular cross section. Similarly, in the above-described eighth embodiment, the input piston 14 and the output piston 90 have the recess 14B and the shaft portion 90B, respectively, each of the recess 14B and the shaft portion 90B having a circular cross section. However, the recess 14B and the shaft portion 90B may have an arbitrary cross-sectional shape. Also, the recess 14B and the shaft portion 90B may have respective plane portions which are engaged with each other in such a manner that the recess 14B and the shaft portion 90B are rectilinearly movable along the axis 12 in relation to each other and are non-rotatable about the axis 12 in relation to each other.

Only the output piston 90 of the above-described fifth embodiment has the orifice 110 for establishing communication between the second cylinder chamber 24 and the third cylinder chamber 106. However, an orifice similar to the orifice 110 may be provided in the output pistons 90 of the above-described fourth and sixth to eighth embodiments.

Furthermore, in the above-described embodiments, the manipulation simulator is a brake stroke simulator, and the input piston 14 is driven rectilinearly along the axis 12 by means of liquid pressure corresponding to an operation force applied by an operator. However, the present invention may be applied to, for example, a manipulation simulator of an automotive accelerator pedal which allows an operator to operate operation means and applies a required operational reaction force to the operator via the operation means. The input piston 14 may be driven along the axis 12 directly by an operation force applied by an operator.

The invention claimed is:

1. A manipulation simulator comprising:
an input member which moves in response to operator's operation of an operation unit,
a reaction force generation unit which generates a reaction force according to an amount of deformation thereof,
an output member whose motion deforms the reaction force generation unit, and
a transmission unit provided between the input member and the output member and adapted to transmit a motion of the input member to the output member and to transmit the reaction force of the reaction force generation unit to the input member via the output member,
wherein the manipulation simulator allows the operator to operate the operation unit and applies an operational reaction force to the operator via the operation unit, the motion of the input member being a rectilinear motion, the reaction force generation unit generating the reaction force linearly according to the amount of deformation thereof, and the transmission unit being configured to continuously and nonlinearly vary a ratio of an amount of motion of the output member to an amount of motion of the input member according to the amount of motion of the input member,
wherein the input member moves rectilinearly along an axis, and the input member and the output member are coaxial with respect to the axis and are fitted to each other in a relatively movable relation, and
the reaction force generation unit generates a rotary reaction force about the axis.

2. A manipulation simulator according to claim 1, wherein the transmission unit includes a cam provided on the input member and a cam follower provided on the output member and engaged with the cam, and, by the cam follower moving to follow the cam, the ratio of the amount of motion of the output member to the amount of motion of the input member is varied continuously and nonlinearly according to the amount of motion of the input member.

3. A manipulation simulator according to claim 2, wherein one of the cam and the cam follower is a cam groove, whereas the other of the cam and the cam follower is a cam groove engagement member which is engaged with the cam groove and moves along the cam groove, and the cam groove extends while being inclined with respect to a circumferential direction about the axis and is curved such that an angle of inclination with respect to the circumferential direction varies gradually and continuously.

4. A manipulation simulator according to claim 3, wherein the cam groove engagement member has a shaft member which is fixed to a corresponding member and extends in a radial direction, and a cam roller which is rotatably supported by the shaft member and is rollably engaged with a wall surface of the corresponding cam groove.

5. A manipulation simulator according to claim 4, wherein the cam groove engagement member has a guide roller which is rotatably supported by the shaft member and is rollably engaged with a wall surface of the corresponding guide groove extending along the direction of rectilinear motion of the input member.

6. A manipulation simulator according to claim 1, wherein the transmission unit converts a rectilinear motion of the input member to a rotary motion and transmits the rotary motion to the output member, and the transmission unit converts a rotary reaction force which the output member receives from the reaction force generation unit, to a reaction force directed opposite the direction of the rectilinear motion of the input member and transmits the reaction force to the input member.

7. A manipulation simulator according to claim 6, wherein, through subjection to deformation about the axis, the reaction force generation unit generates the rotary reaction force about the axis linearly according to the amount of deformation.

8. A manipulation simulator according to claim 1, wherein the transmission unit converts the rectilinear motion of the input member to a rectilinear motion of a different direction and transmits the rectilinear motion of the different direction to the output member.

9. A manipulation simulator according to claim 8, wherein the direction of rectilinear motion of the output member is opposite the direction of rectilinear motion of the input member.

10. A manipulation simulator comprising:
an input member which moves in response to operator's operation of an operation unit,
a reaction force generation unit which generates a reaction force according to an amount of deformation thereof,
an output member whose motion deforms the reaction force generation unit, and
a transmission unit provided between the input member and the output member and adapted to transmit a motion of the input member to the output member and to transmit the reaction force of the reaction force generation unit to the input member via the output member,
wherein the manipulation simulator allows the operator to operate the operation unit and applying an operational reaction force to the operator via the operation unit, the motion of the input member being a rectilinear motion, the reaction force generation unit generating the reaction force linearly according to the amount of deformation thereof, and the transmission unit being configured to continuously and nonlinearly vary a ratio of an amount of motion of the output member to an amount of motion of the input member according to the amount of motion of the input member, and
wherein the transmission unit includes an intermediate member, a first transmission unit which converts the rectilinear motion of the input member to a rotary motion and transmits the rotary motion to the intermediate member, and a second transmission unit which converts the rotary motion of the intermediate member to a rectilinear motion and transmits the rectilinear motion to the output member, and at least one of the first transmission unit and the second transmission unit varies a ratio of an amount of motion of a motion transmission destination member to an amount of motion of a motion transmission source member continuously and nonlinearly according to the amount of motion of the motion transmission source member.

11. A manipulation simulator according to claim 10, wherein the input member moves rectilinearly along an axis, and the direction of rectilinear motion of the output member intersects the axis.

12. A manipulation simulator according to claim 11, wherein the first transmission unit is configured to continuously and nonlinearly vary a ratio of an amount of motion of the intermediate member to an amount of motion of the input member according to the amount of motion of the input member, and the second transmission unit is configured to continuously and nonlinearly vary a ratio of an amount of motion of the output member to the amount of motion of the intermediate member according to the amount of motion of the intermediate member.

13. A manipulation simulator according to claim 11, wherein each of the first transmission unit and the second transmission unit includes a cam provided on the motion transmission source member and a cam follower provided on the motion transmission destination member and engaged with the cam, and, by the cam follower moving to follow the cam, the ratio of the amount of motion of the motion transmission destination member to the amount of motion of the motion transmission source member is varied continuously and nonlinearly according to the amount of motion of the motion transmission source member.

14. A manipulation simulator according to claim 13, wherein one of the cam and the cam follower is a cam groove, whereas the other of the cam and the cam follower is a cam groove engagement member which is engaged with the cam groove and moves along the cam groove, and the cam groove of at least one of the first transmission unit and the second transmission unit extends while being inclined with respect to a circumferential direction about the axis, and is curved such that an angle of inclination with respect to the circumferential direction varies gradually and continuously.

15. A manipulation simulator according to claim 14, wherein the cam groove of the first transmission unit and the cam groove of the second transmission unit have the same angle of inclination with respect to the circumferential direction as measured at respective positions where, when the amount of motion of the input member is zero, the cam groove engagement members are engaged with the corresponding cam grooves.

16. A manipulation simulator according to claim 14, wherein
the manipulation simulator includes a housing for accommodating the input member, the intermediate member, and the output member therein;
the intermediate member is fitted to the input member and the output member in such a manner as to surround the input member and the output member about the axis, and supports the input member and the output member in such a manner that the input member and the output member are rectilinearly movable along the axis;
the housing is fitted to the intermediate member in such a manner as to surround the intermediate member about the axis, and supports the intermediate member in such a manner that the intermediate member is rotatable about the axis;

the cam groove of the first transmission unit and the cam groove of the second transmission unit are provided on the intermediate member;

the cam groove engagement member of the first transmission unit and the cam groove engagement member of the second transmission unit are provided on the input member and the output member, respectively;

the housing has guide grooves extending along the axis; and the cam groove engagement member of the first transmission unit and the cam groove engagement member of the second transmission unit radially extend through the cam groove of the first transmission unit and the cam groove of the second transmission unit, respectively, and are engaged with the corresponding guide grooves in such a manner as to be movable along the guide grooves.

17. A manipulation simulator according to claim 16, wherein the reaction force generation unit is elastically attached between the output member and the housing and is subjected to compressive deformation along the axis.

18. A manipulation simulator according to claim 16, wherein the input member and the output member are spaced apart from each other along the axis at the same circumferential position about the axis, and the cam groove engagement member of the first transmission unit and the cam groove engagement member of the second transmission unit are engaged with a common guide groove.

19. A manipulation simulator according to claim 14, wherein a range in which the cam groove of the first transmission unit extends along the axis and a range in which the cam groove of the second transmission unit extends along the axis overlap each other at least partially as viewed along a circumferential direction about the axis.

20. A manipulation simulator according to claim 11, wherein the ratio of the amount of motion of the output member to the amount of motion of the intermediate member is greater than the ratio of the amount of motion of the intermediate member to the amount of motion of the input member.

21. A manipulation simulator according to claim 11, wherein the first transmission unit and the second transmission unit are configured to rectilinearly move the output member along the axis in the same direction as that of rectilinear motion of the input member.

22. A manipulation simulator according to claim 21, wherein, when the amount of motion of the input member is zero, the input member and the output member are in contact with each other.

23. A manipulation simulator according to claim 22, wherein the manipulation simulator includes tensile stress generation unit which is elastically attached between the input member and the output member and which, upon subjection to tensile deformation along the axis, generates tensile stress along the axis linearly according to an amount of tensile deformation.

24. A manipulation simulator according to claim 11, wherein the input member and the output member have respective portions which are engaged with each other along the axis; and the first transmission unit and the second transmission unit are provided at the portion of the input member and the portion of the output member, respectively, and are separated from each other in a circumferential direction about the axis.

25. A manipulation simulator according to claim 24, wherein the input member and the output member have respective pairs of arm portions extending along the axis toward the output member and the input member, respectively, and the paired arm portions of the input member and the paired arm portions of the output member are disposed alternately as viewed along a circumferential direction about the axis and prevent a relative rotary motion about the axis between the input member and the output member while allowing a relative rectilinear motion along the axis between the input member and the output member.

26. A manipulation simulator according to claim 25, wherein the input member and the output member have the same shape and are disposed along the axis in an oppositely oriented relation.

27. A manipulation simulator according to claim 24, wherein one of the input member and the output member has a shaft portion which extends along the axis toward the other member of the input member and the output member, and the other member has a recess which extends along the axis and receives the shaft portion in such a manner that the shaft portion and the recess are rectilinearly movable along the axis in relation to each other;

a cam groove engagement member of the first transmission unit and a cam groove engagement member of the second transmission unit are provided at the shaft portion and at a portion around the recess, respectively, and are spaced apart from each other along a circumferential direction about the axis; and the portion around the recess has a slit for allowing the cam groove engagement member provided at the shaft portion to rectilinearly move along the axis in relation to the portion around the recess.

28. A manipulation simulator according to claim 11, wherein the first transmission unit and the second transmission unit are configured to rectilinearly move the output member along the axis in a direction opposite that of rectilinear motion of the input member, and the reaction force generation unit is elastically attached between the input member and the output member and is subjected to compressive deformation along the axis.

29. A manipulation simulator according to claim 11, wherein, in cooperation with other members, the output member defines on its opposite sides two cylinder chambers which are filled with liquid and whose volumes are variable; the output member has an orifice for establishing communication between the two cylinder chambers; and, in association with rectilinear motion of the output member, the liquid flows from one of the two cylinder chambers to the other cylinder chamber through the orifice.

30. A manipulation simulator according to claim 10, wherein the input member and the output member move rectilinearly along a common axis, and the input member and the output member are coaxial with respect to the axis and are fitted to the intermediate member.

* * * * *